(12) United States Patent
Waldorf

(10) Patent No.: US 7,340,745 B2
(45) Date of Patent: Mar. 4, 2008

(54) SYSTEMS AND METHODS FOR MAPPING API CALLS

(75) Inventor: Jerry A. Waldorf, Woodland Hills, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 781 days.

(21) Appl. No.: 10/602,013

(22) Filed: Jun. 23, 2003

(65) Prior Publication Data

US 2006/0156314 A1    Jul. 13, 2006

Related U.S. Application Data

(60) Provisional application No. 60/392,015, filed on Jun. 25, 2002.

(51) Int. Cl.
    *G06F 3/00* (2006.01)
    *G06F 3/048* (2006.01)

(52) U.S. Cl. ........................ 719/328; 715/835

(58) Field of Classification Search ............ 719/310, 719/328; 715/835
    See application file for complete search history.

(56) References Cited

U.S. PATENT DOCUMENTS

| | | | |
|---|---|---|---|
| 5,680,551 A | 10/1997 | Martino, II | |
| 5,797,006 A | 8/1998 | Sitbon et al. | |
| 5,983,265 A | 11/1999 | Martino, II | |
| 6,049,673 A | 4/2000 | McComb et al. | |
| 6,058,389 A | 5/2000 | Chandra et al. | |
| 6,256,676 B1 | 7/2001 | Taylor et al. | |
| 6,321,374 B1 | 11/2001 | Choy | |
| 6,407,761 B1 * | 6/2002 | Ching et al. | 715/835 |
| 6,559,871 B1 * | 5/2003 | Brozowski et al. | 715/853 |
| 6,823,495 B1 * | 11/2004 | Vedula et al. | 715/805 |

* cited by examiner

*Primary Examiner*—William Thomson
*Assistant Examiner*—LeChi Truong
(74) *Attorney, Agent, or Firm*—Hickman Palermo Truong & Becker LLP

(57) ABSTRACT

The invention is related to methods and apparatus that provide a graphical-user-interface-based tool using drag and drop functionality to manipulate descriptions of the interface between two dissimilar API functions. A graphical-user-interface-based tool advantageously permits a user to draw lines between the parameter nodes of the two APIs to indicate the translation of data elements from a first form in which the nodes exist in one API to a second form in a different API. The graphical-user-interface-based tool also depicts the flow of information into a set of API call input parameters, and the flow of information resulting from that API call into another set of nodes. In one embodiment, API functions and parameters are represented as nodes within an object hierarchy, providing a convenient relationship between the nodes, and variables and methods written in an object oriented programming language.

15 Claims, 15 Drawing Sheets

| FIG. 4A |
|---|
| FIG. 4B |

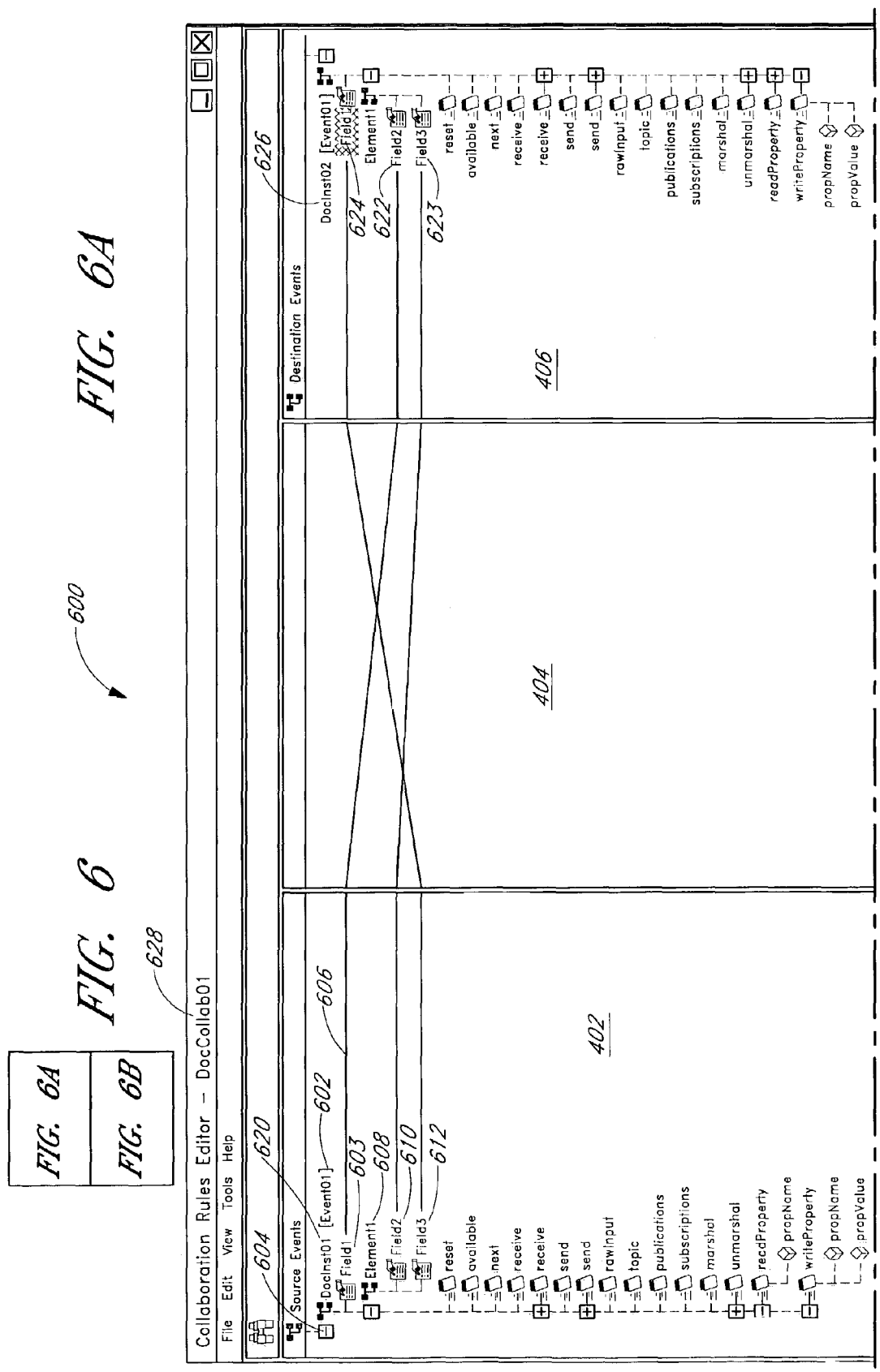

FIG. 6B

SYSTEMS AND METHODS FOR MAPPING API CALLS

RELATED APPLICATION

This application claims the benefit under 35 U.S.C. § 119(e) of U.S. Provisional Application No. 60/392,015, filed Jun. 25, 2002, the entirety of which is hereby incorporated by reference.

BACKGROUND OF THE INVENTION

1. Field of the Invention

The invention generally relates to computer software, and in particular to systems and methods for representing and/or generating software code for application program interfaces (APIs).

2. Description of the Related Art

Individuals, businesses, schools, governmental agencies, and the like use computer software to assist in the performance of a myriad of tasks. A very wide variety of software applications are available from many software vendors. Often, one vendor's software application is not compatible with another vendor's software application. This incompatibility is even more acute among enterprise applications, which are typically more specialized than consumer software.

Input/output data can flow through an enterprise application via an application program interface (API). However, standardized interfaces, such as standardized APIs for applications written under Windows® by Microsoft Corporation, are not typically encountered with enterprise applications. Rather, the API for an enterprise application is typically unique to that application and/or to that software vendor. Despite the resulting incompatibility between enterprise applications, the sharing of data between incompatible software applications is often desired by end users. For example, companies with disparate and incompatible software systems may decide to become business partners. Companies with disparate software systems may merge. A business may prefer a particular application for one task from one vendor, and prefer another application for a different task and yet desire to share data between the applications.

One tool that permits otherwise incompatible systems to work together, i.e., "collaborate," is known as "middleware." Middleware is intermediate software that modifies data for compatibility. Such middleware can be used to permit disparate applications to communicate, to permit a software application to communicate with an otherwise incompatible database, and the like. For example, middleware can translate data flows between two dissimilar or otherwise incompatible APIs, can translate messages from one format to another, and the like.

Traditional techniques to generate middleware are inadequate. Traditional techniques, such as hand coding, are slow and are prone to errors.

SUMMARY OF THE INVENTION

One embodiment of the invention is related to methods and apparatus that provide a graphical-user-interface-based tool using drag and drop functionality to manipulate descriptions of the interface between two dissimilar API functions. A graphical-user-interface-based tool advantageously permits a user to draw lines between the parameter nodes of the two APIs to indicate the translation of data elements from a first form in which the nodes exist in one API to a second form in a different API. The graphical-user-interface-based tool also depicts the flow of information into a set of API call input parameters, and the flow of information resulting from that API call into another set of nodes. In one embodiment, API functions and parameters are represented as nodes within an object hierarchy, providing a convenient relationship between the nodes, and variables and methods written in an object oriented programming language.

One embodiment of the invention is a systems integration tool that combines a drag and drop graphical user interface (GUI) with object-oriented programming to generate code that translates data from various sources to various destinations.

To implement such a systems integration tool, API functions and parameters can be represented as nodes within an object hierarchy. This representation, combined with the hierarchical structure used by certain object oriented languages, creates a convenient relationship between nodes in the structure hierarchy and variables and object methods written in the object oriented programming language. The input parameters to the object methods can be a destination of information, and the output parameters can be a source. Providing a relatively clear distinction between the two aids the user in creating and/or using a map, i.e., the translation from the source event type definition to the destination event type definition.

Included with the tool can also be utilities, such as an XML builder or an Intermediate Document (IDoc) builder, that can be used to create the pattern of nodes in the structure hierarchy that corresponds to a known API or message standard, thereby saving a user from the chore of entering the structure manually, and lessening the likelihood of error. These utilities enable the integration engineer to use the same convenient drag and drop methodology to call API functions as the drag and drop methodology used to translate messages from one form to another.

In one embodiment, the utilities include the following interacting components: event type definition (ETD) editor; event translation or collaboration rules editor; a set of API functions pre-programmed in an object-oriented language, such as Java; and a set of adapters for certain types of enterprise applications. Examples of adapters include databases, enterprise resource planning (ERP) applications, enterprise financial applications, and the like.

BRIEF DESCRIPTION OF THE DRAWINGS

These and other features of the invention will now be described with reference to the drawings summarized below. These drawings and the associated description are provided to illustrate preferred embodiments of the invention and are not intended to limit the scope of the invention.

FIG. 6 consists of FIGS. 6A and 6B and illustrates an exemplary display of a graphical user interface for a collaboration rules editor that can be used to translate an input event into an output event.

DETAILED DESCRIPTION OF PREFERRED EMBODIMENTS

Figure 1A:
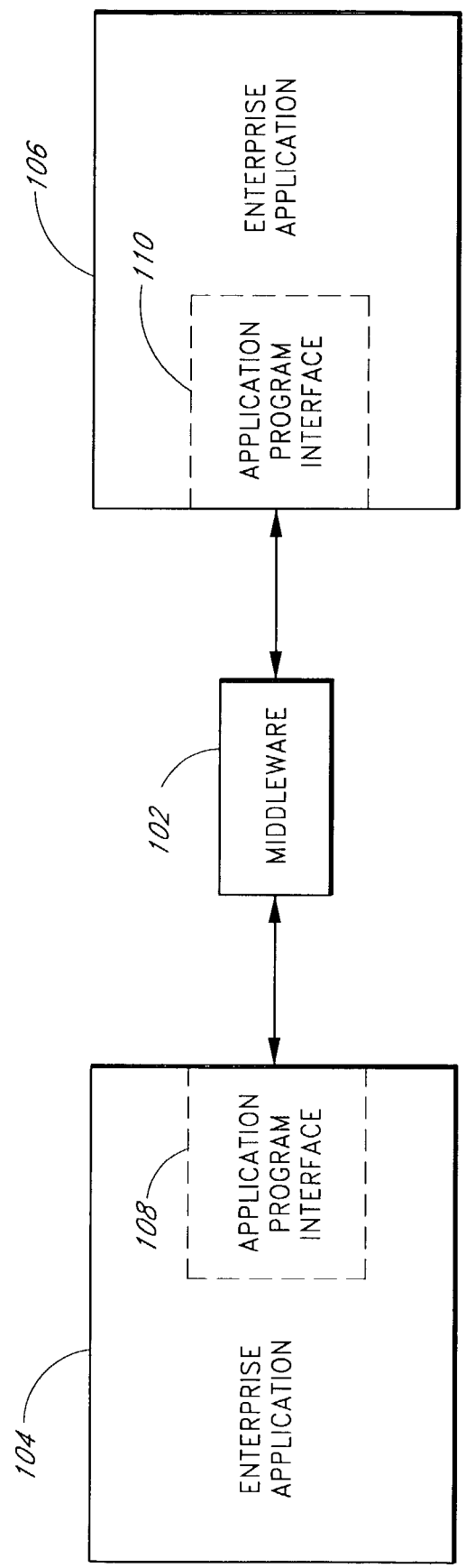
FIG. 1A illustrates integration of two disparate enterprise applications via middleware.

Although this invention will be described in terms of certain preferred embodiments, other embodiments that are apparent to those of ordinary skill in the art, including embodiments that do not provide all of the benefits and features set forth herein, are also within the scope of this invention.

Embodiments of the invention include a graphical user interface that intuitively and efficiently represents messages between software objects, such as APIs that are integrated by enterprise application integration (EAI) middleware. In another embodiment, the middleware can be used for message translation and/or routing between objects. In another embodiment, the middleware provides translation and/or routing between an application and a database. Advantageously, a graphical user interface can efficiently illustrate data flows, such as a data flow across a common interface of the EAI function. Advantageously, these graphical representations speed coding and reduce errors in generating and/or debugging middleware code.

A graphical user interface includes a window area or pane in a display screen. The graphical user interface can include one or more of such panes. A user can use a pointing device, such as a mouse device, a trackball, a touch pad, a touch screen, and the like to manipulate a pointer on the display screen. The pointer is typically shaped as an arrow, but it will be understood that a variety of shapes can be used for the pointer. The pointer is a graphical symbol that is used to select objects and commands. For example, the pointer can be used to select commands from a pulldown menu. In another example, the pointer can be used to select an icon, which can be a graphical or pictorial representation of data or a function, such as a command. In one embodiment, at least a portion of the middleware code is automatically generated in response to user interaction with the graphical user interface.

Computer software, including middleware, can be written in a wide variety of programming languages and stored in a variety of computer-readable mediums. For example, software developers can generate computer code using procedural programming techniques and/or using object-oriented programming techniques. Examples of programming languages that support object-oriented programming techniques include C++, Java, and Smalltalk. Object-oriented programming techniques can advantageously promote the reuse of code, which beneficially saves labor with respect to the writing of software specifications, the coding of the software, the testing of software, and the like.

A computer program written in an object-oriented programming language uses software objects ("objects"). An object can inherit characteristics from other objects and can also be formed from a class by instantiating the class. This permits a new program or revisions to existing programs to be relatively easily made by modifying or reusing existing software objects.

An object is a bundle of variables and related methods. A method can be an event or a function. An example of an event is some code that activates in response to an external input, such as a keyboard stroke or a mouse click. An example of a function is code that performs a task, such as a behavior. With object-oriented programming, the variables or arguments of an object are not accessed directly, but are accessed through a corresponding method. In the Java programming language, a method of an object is indicated to the right of a "." in the code.

Objects call or communicate with each other using messages. For example, a message can instruct a software object to behave in some manner. A message can also be passed with a parameter, which is a value that is used by the receiving object to perform the desired behavior. For example, the message may indicate a software object to respond to a keystroke. A parameter can be passed that includes the value of the keystroke, e.g., the character that was selected.

These objects can advantageously be used in API integration to permit disparate software systems to collaborate. Messages from an API for one application can be translated via one or more collaboration rules to a usable format for a second application. A collaboration rule can, for example, select which data is transferred, selectively manipulate the data, such as, for example, change the case of text or change the scale or units, selectively reorder data such that the data is rearranged, and the like.

FIG. 1A illustrates integration of two disparate enterprise applications via middleware 102. A business or other entity may want to integrate a first enterprise application 104 and a second enterprise application 106 such that the enterprise applications share data or otherwise work together. However, the first enterprise application 104 and the second enterprise application 106 may not be able to communicate with each other directly such that the first enterprise application 104 and the second enterprise application 106 can collaborate on an activity. For many reasons, such as the cost or the features of particular software, an entity may select software that is incompatible with other software. In another example, an entity may use software from a particular vendor that does not directly communicate with software that is used by a business partner.

There can be many reasons why disparate enterprise applications are often incapable of direct communication with each other. For example, software vendors may choose to use proprietary interfaces so that software from different vendors cannot directly communicate. In another example, different versions of software may not be compatible with other versions of the software.

Typically, an enterprise application communicates with other applications or with external databases via an application program interface (API). An API can include interface methods such as routines, protocols and other tools for communicating with the enterprise application.

These interface methods, in turn, can use parameters. For example, an application designed to keep track of a company's employees can have a specific method for entering a new employee into its database. This interface method can be called EnterNewEmployee, and use the parameters EmployeeNumber, FirstName, LastName, and Address. After entry in the database by calling the EnterNewEmployee method, the employee's data can be retrieved with another method, GetEmployee, which, for example, can take EmployeeNumber as an input parameter, and return the output parameters of EmployeeNumber, FirstName, LastName, and Address, in that order.

One challenge of integrating enterprise applications arises from the fact that vendors provide APIs that use methods and parameters that are not consistent with APIs from other vendors. For example, a payroll application from another vendor that communicates with the foregoing employee database can attempt to retrieve employee information using an interface method called GetWorker that uses a parameter of EmpNo instead of EmployeeNumber, and can be configured to have information returned in the order LastName, FirstName, EmpNo, and without an Address.

In the example illustrated in FIG. 1A, the middleware 102 communicates with the first enterprise application 104 and the second enterprise application 106 via a first API 108 and a second API 110, respectively, so that the first enterprise application 104 and the second enterprise application 106 can communicate. It will be understood that such communication can be in one direction or the other direction, or in both directions.

In another embodiment, one or both of the first enterprise application 104 and the second enterprise application 106 can be substituted by a relational database management system (RDMS). In the context of relational databases, the middleware 102 can advantageously be used to permit the combination of data from two or more disparate databases or can be used to permit an enterprise application to retrieve data from or to store data in an otherwise incompatible relational database by providing mapping from one format to another.

Embodiments of the invention include tools and techniques that advantageously permit a software developer to rapidly develop middleware in an efficient and robust manner via an intuitive graphical user interface. This permits middleware to be developed in a fast and efficient manner, thereby providing businesses with the freedom to be able choose from a wide variety of computer systems, enterprise applications, and business partners, without having to worry about whether the disparate computer systems and/or enterprise applications can be linked together. For example, an embodiment of the invention can be used by a business that performs its own enterprise integration to develop middleware for API calls in a fast, robust, and efficient manner.

Conventional approaches to generate middleware are time consuming and prone to errors. Use of these conventional techniques can cause lengthy debugging time, can cause costly delays in the integration of disparate systems, can cause companies to maintain outdated software to maintain compatibility with other systems, can cause system crashes upon errors, and the like. Examples of conventional approaches to generate middleware include manual coding techniques without any graphical representation of the messages mapped between software objects, using an integration component provided by the developer of the application, and a rudimentary graphical software object message representation that will be described later in connection with FIG. 1B.

One conventional approach is manual coding. With manual coding, there is no graphical representation of messages between software objects in integration middleware, such as APIs in integration middleware, other than the corresponding text to the manually-generated source code for the message translation function. That is, the middleware is implemented by manually writing code in a programming language that permits the usual constructs: definition of variables, assignment into variables, conditionals, looping and function calls. The APIs are called directly from within the middleware code. Thus, manually-coded integration projects can be heavily dependent upon the coding skills of the integration engineer in the language(s) used by the integration software and the effectiveness of the coding tools provided with the integration software.

For example, suppose that an integration engineer intends to copy a piece of data from a table in one relational database to a table in another relational database. For example, the integration engineer can be provided with API functions that: open a database connection; create a cursor to a statement; fetch data from the cursor; close the cursor; execute arbitrary statements against the database; and close the database connection.

With these API functions available, the integration engineer can then write code, such as the following (using C-style syntax):

```
DBConnHandle sourceDB, destDB;
StmtCursor cursor01;
String FName;
sourceDB = openDBConnect ('database1','username','password');
cursor01 = openDBCursor (sourceDB,
        'select FirstName from emp where empID=1550');
FName = fetchDB (cursor01);
CloseDBCursor (cursor01)
destDB = openDBConnect ('database2','otheruser','otherpassword');
Status = DBSQLExecute (destDB,
        'insert into staff(firstname) values (' && FName && ')');
DBLogout(sourceDB);
DBLogout(destDB);
```

One drawback of this approach is that interaction directly with source code can be relatively error-prone and can involve a relatively lengthy development cycle. Disadvantageously, when code is manually generated, errors in syntax and logic are easily made. Methods for automatically generating code for mapping API calls will be described in greater detail later in connection with FIGS. 5A and 5B. In one example, to detect syntax errors, a compiler processes the source code and generates a report. Often, eliminating one syntax error uncovers other previously undetected errors so that multiple passes through the compile stage are performed before syntactically correct code is generated. Even when syntactically correct code is written, logical errors can remain, such as the calling of functions in an incorrect sequence. The frequency of occurrence of function call errors can dramatically increase when several functions are to be executed by the code in a coordinated fashion.

Another approach used to communicate with an enterprise application is to install an integration component specifically provided by the enterprise application vendor to interface with the application. Interaction with the enterprise application should conform to the restrictions programmed into this special piece.

A drawback of this second approach is that the integration component, i.e., the middleware, that uses the application API should also have an API of its own, which can add an extra layer of complexity, can enforce its own access rules, and can possibly restrict the type of access available to the application API. If the EAI system is programmed to interact with an enterprise application through the integration component API, that programming itself is necessarily as general as the original API, in which case relatively little saving in complexity is gained. Further disadvantageously, the integration component API often restricts the capabilities of the original API in some way that may not be suitable to the needs of the enterprise.

Figure 1B:
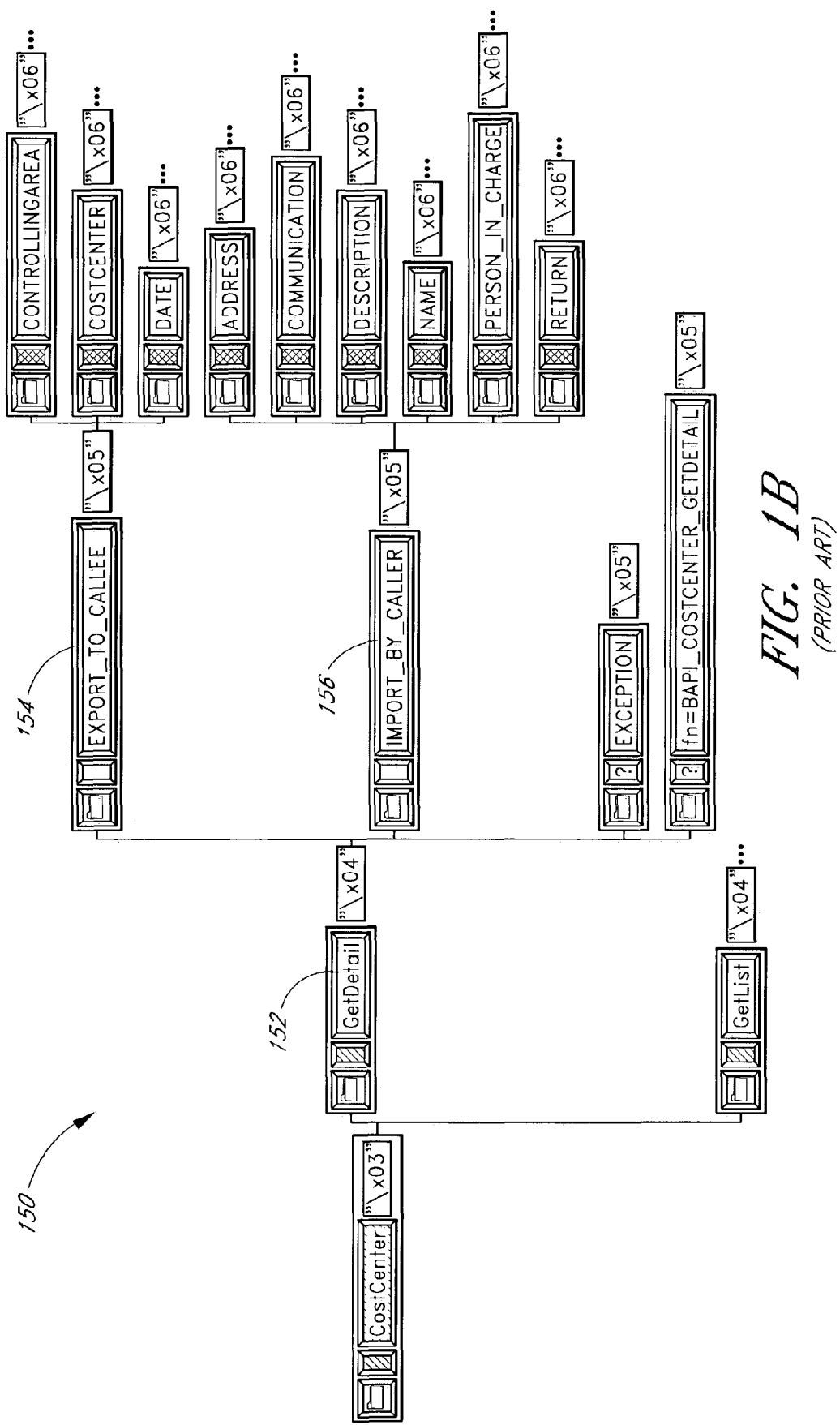
FIG. 1B illustrates a sample display of a conventional graphical user interface (GUI) that can represent an application program interface (API) in a tree with nodes representing the input and output parameters of the interface method.

Yet another approach is to provide a relatively simple conventional graphical user interface (GUI) to allow the integration engineer to represent the APIs in some graphical manner as illustrated below in FIG. 1B. The GUI illustrated in FIG. 1B illustrates an example of such a graphical API representation 150, which models an interface method GetDetail 152 as a tree with nodes 154, 156 representing the input and output parameters of the interface method GetDetail 152. From the standpoint of application integration, a relatively significant drawback of the illustrated graphical API representation 150 is that the graphical API representation 150 does not distinguish between input and output parameters, and the graphical API representation 150 does not show the data flows into and out of the interface method GetDetail 152. Furthermore, the graphical API representation 150 does not show connectivity between APIs, and does not show translation and/or mapping between APIs of disparate applications.

One embodiment of the invention advantageously provides a comprehensive, GUI-based tool using drag and drop functionality to manipulate descriptions of the interface between two dissimilar API functions. An API function is known as an API call when the API function is incorporated in programming code. For example, a pointing device, such as a mouse device, can be used to manipulate the position of a screen pointer to drag and drop items on the display screen. An item can be selected by, for example, clicking and holding down a mouse button on the mouse device. The item can be dragged, for example, by moving the cursor with the mouse device while holding down the mouse button. The item can be dropped, for example, by releasing the mouse button on the mouse device after moving the cursor to the desired portion on the screen. Advantageously, embodiments of the invention advantageously draw lines in the graphical user interface between the graphical-representations of parameter nodes of the two dissimilar APIs to graphically indicate the correspondence and the translation of data elements from the form in which they exist in one API to the form in which they exist in the other API.

In addition to the correspondence of data from one API to another API and to the translation of data as will be described later in connection with FIG. 6, one embodiment of the invention can further depict a flow of information from a source of information with parameters or data that are used in an API call into a set of input parameters of an API call and from the results of that API call into a separate set of nodes. The input/output flow of the API call can be graphically shown to the user, thereby providing the use with a "report" of what the to-be-generated program is configured to do at run time. The drag and drop feature makes it simpler to map different APIs, and the graphical linkage of input and output records the flow of information to and from the API.

Embodiments of the invention can include an integrated, object-oriented toolset or user interface that can manage a portion of or the entire integration development process from defining message formats and API formats to using these formats via drag-and-drop methodology to define, compile, and execute API calls as part of message translation and message routing.

Advantageously, embodiments of the invention can maintain information about the properties of an integration component, e.g., properties of API function calls, and the relationships between them in such a manner as to enable these properties to be manipulated by a drag and drop interface.

By maintaining a full description of object properties and relationships, the graphical editors promote operations that make logical sense and can advantageously reduce operator errors, thereby saving time and expense.

Event Type Definitions

An event type definition can be defined by a collection of nodes and can be used to describe structured messages, API calls, stored procedures, and the like. There can be a variety of node types, with each node type having specified set properties. In one embodiment of an event type definition, a node in a hierarchical tree can correspond to one of the following types of nodes: element, field, method, and parameter. In one example, the nodes can be arranged in a structure according to the following illustrative rules. An element node can have one or more sub-nodes of any type and can be used to organize the hierarchical structure, such as, for example, to arrange multiple fields in a record. For example, an element node can be used to group other nodes related to a software object. A field node has no sub-nodes and can be used to store data, such as data for a field of a database. A method node has zero or more sub-nodes of parameter type. A method node can correspond to a method of an object in an object-oriented programming language, such as to an event or to a function of an object. For example, in the Java programming language, a method of an object is specified to the right of a "." in the code. A parameter node has no sub-nodes. A parameter node can correspond to, for example, a parameter that is used by a method of a software object.

An event type definition can have at least two representations: a graphical representation for display on a display device, such as a display screen, and a coded representation for storage in a file, e.g., encoded in text. It will be understood that the coded representations for event type definitions can be stored individually in single files or can be grouped with other information, including other event type definitions.

A text representation enables the extended structure to be compactly or efficiently stored for later retrieval. A software system can interpret or decode the structure embedded in the text representation by parsing the text representation of the structure according to predefined parsing rules. For example, selected delimiters, such as "\x03," "\x04," and the like can be used to indicate a level within a hierarchy for a corresponding node as shown and described earlier in connection with FIG. 1B.

A text representation can be used by message translation software, can be re-used in other structures, can be retrieved for modification, and the like. The graphical representation forms part of a drag and drop interface, which advantageously permits the structure to be modified in an intuitive manner. In one embodiment, the graphical representation is not stored, but rather, is generated from the text representation as needed.

Field Node

Within an event type definition that describes a structured message, the presence of a field node represents data of a specific format. The properties of a field node can correlate to various representations of data, such as fixed or delimited format, opening and closing delimiters, number of occurrences, and optional fixed values. Other examples of data that can be stored in a field node include a person's last name, ID numbers, etc.

A field is represented within an object-oriented language by a class variable of a given type.

Element Node

An element node can correspond to a grouping of one or more fields or elements. In one embodiment, an element does not contain specific data, and corresponds to a logical construct. For example, the properties of an element can correlate to various groupings of data including repetition counts, repetition order, and delimiters. An element node is represented by a class within the object oriented language that implements the translation or mapping of data by the resulting middleware.

Element nodes that are contained within other element nodes (closer to the root node) are represented by subclasses that are defined within superclasses. In one embodiment, the object hierarchy of elements and fields can correspond to a class hierarchy in the programming language.

Method Node

A method node can correspond to a function with zero or more arguments. In accordance with object-oriented programming concepts, a method node will typically operate on variables or data within its class. In one embodiment, a method node corresponds to a function for a class before the class has been instantiated into an object. In addition, a method node according to one embodiment of the invention can operate on fields, on elements defined within the structure, or on parameters passed to the method node.

Parameter Node

A parameter node represents an argument to a method node. The properties of a parameter describe the data type of the parameter, such as whether the data corresponds to text characters, to numbers, and the like.

Structured Messages

A structured message is a structured dataset that can be passed as a unit from a source to a destination. A structured message can also be used to communicate with a software object, an API call, a stored procedure, and the like.

A structured message can be described by an event type definition with element and field nodes. The presence of a field node represents data within the message. The presence of an element node represents a grouping of one or more field or element nodes. By creating a hierarchical tree of field and element nodes, and by specifying the properties of each node, the format of a class of messages can be fully described in a fashion that makes individual fields of a given in the class accessible to a translation engine, such as middleware.

EXAMPLE 1

Event Type Definition

Figure 2A:
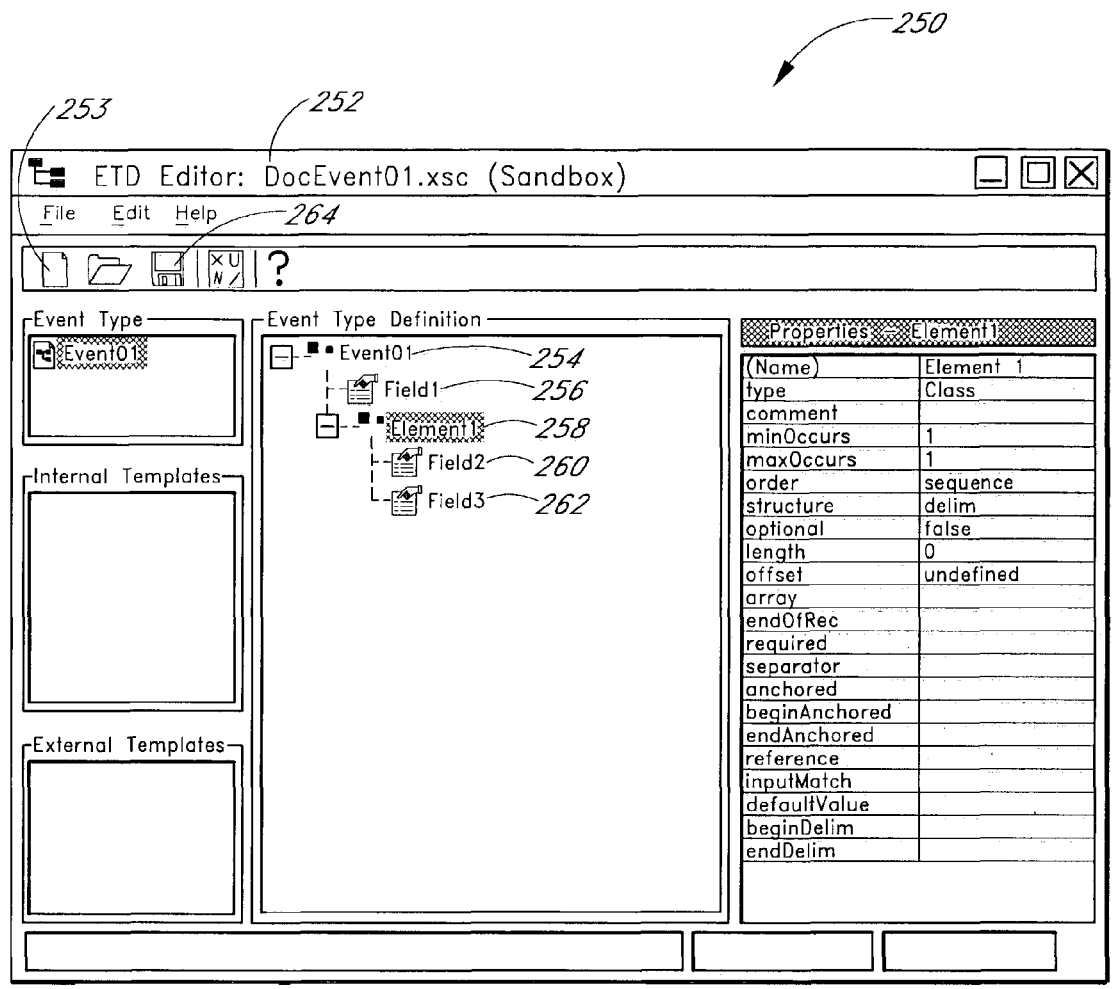
FIG. 2A illustrates a sample display of a drag and drop interface of an event type definition editor according to one embodiment of the invention for a simple event type definition.

FIG. 2A illustrates an example of using an event type definition (ETD) editor 250 to generate a structure. Such a structure can be used in, for example, a structured message.

In the illustrated example, a user, such as an integration engineer, used the event type definition editor 250 as follows: (1) created a new structure named "DocEvent01.xsc" 252 using a standard or predefined event type definition (ETD) template, which can used as a starting point for making a new structure, which results in a Java package or collection of Java classes named in the example as "DocEvent01.xsc;" (2) renamed the root node of the structure to "Event01" 254; (3) added a field "Field1" 256 as a child node to the root node of "Event01" 254; (4) added an element "Element01" 258 after the field "Field1" 256 and then created two subfields "Field2" 260 and "Field03" 262 within the element "Element01" 258; and (5) saved the new structure under the name "DocEvent01" by, for example, selecting a save icon 264 with a pointing device.

One embodiment of user interface for the event type definition editor 250 with the resulting structure loaded in a middle pane of the display screen is illustrated in FIG. 2A. A use of the structure created by the event type definition editor 250 is described in greater detail later in connection with a collaboration rules editor in FIG. 6.

When this structure is saved, the file "Event01.xsc" is created. When the "Event01.xsc" file is compiled, the file Event01.java is created. Methods for automatically generating code for mapping API calls will be described in greater detail later in connection with FIGS. 5A and 5B.

Figure 2B:
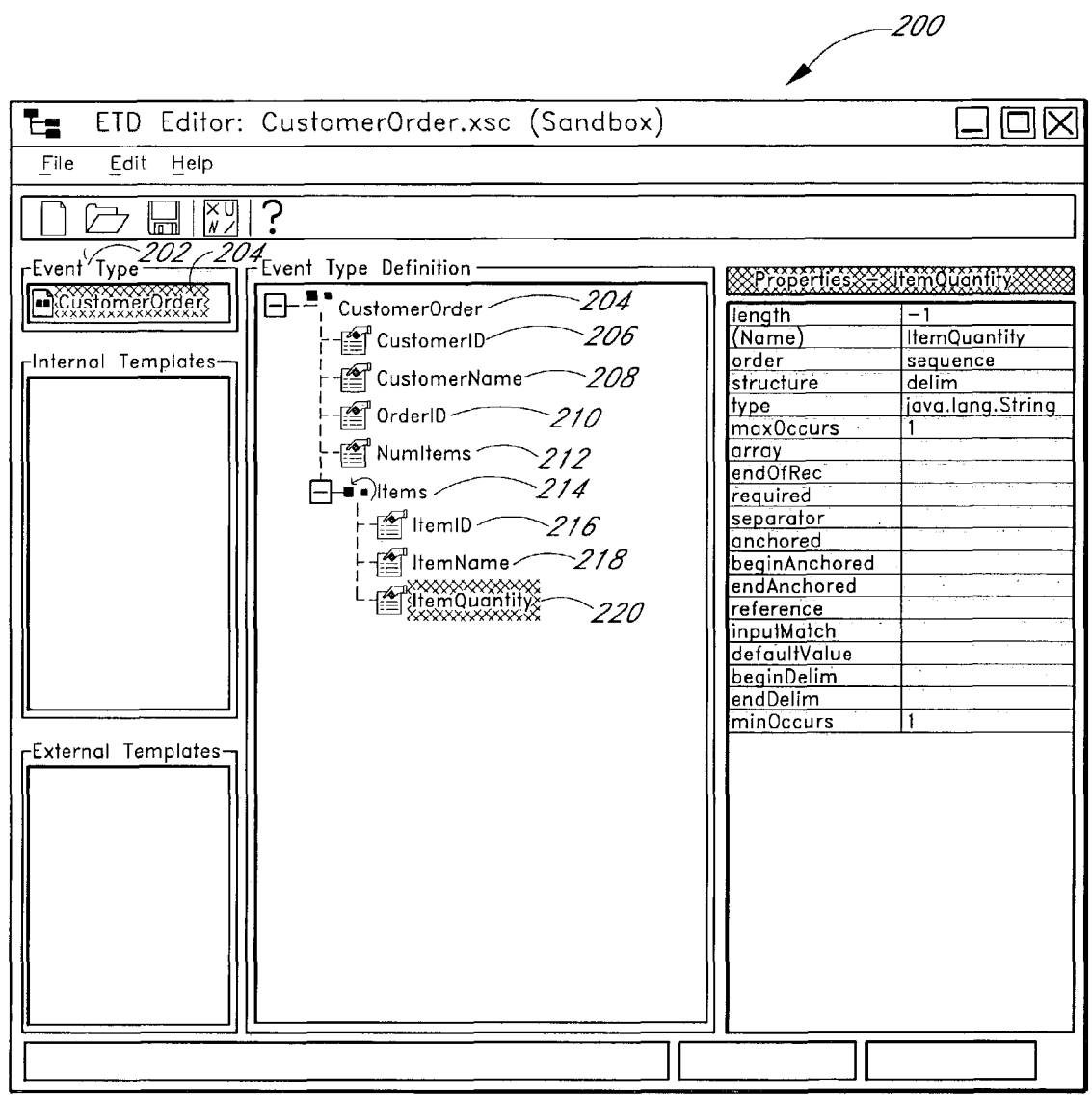
FIG. 2B illustrates a sample display of an event type definition editor, where the event type definition editor is illustrated with a message structure loaded and displayed.

FIG. 2B illustrates a sample display of an event type definition editor 200 according to one embodiment of the invention with a message structure loaded and displayed. The message structure can correspond to a structured message between software objects, API calls, stored procedures, and the like.

For example, a structured message that is displayed in FIG. 2B can correspond to the processing of customer orders 204. The name 202 for the structured message is shown in FIG. 2B. The structured message contains information describing a customer in the "CustomerID" 206, "CustomerName" 208, "OrderID" 210, and "NumItems" 212 fields. Each of these fields occurs once in the illustrated structured message.

Following these fields 206, 208, 210, 212 is an "Items" element 214 that groups subsequent fields into a single group. The Items element 214 can repeat a variable number of times within the message, although the actual number of repetitions should match the value in the NumItems field 212. Each repetition describes a single type of ordered item and the quantity that is ordered. Within the Items element 214 shown are three fields: an "ItemID" field 216, an "ItemName" 218, and an "ItemQuantity" field 220.

In FIG. 2B, the "ItemQuantity" field 220 is selected, and a pane to the right in FIG. 2B illustrates selected properties for the ItemQuantity field 220. For example, the selected properties can be used to describe the selected field, such as the type of data stored in the field, the length of the field, whether is it single or repeating, what delimits the field, etc.

Figure 3:
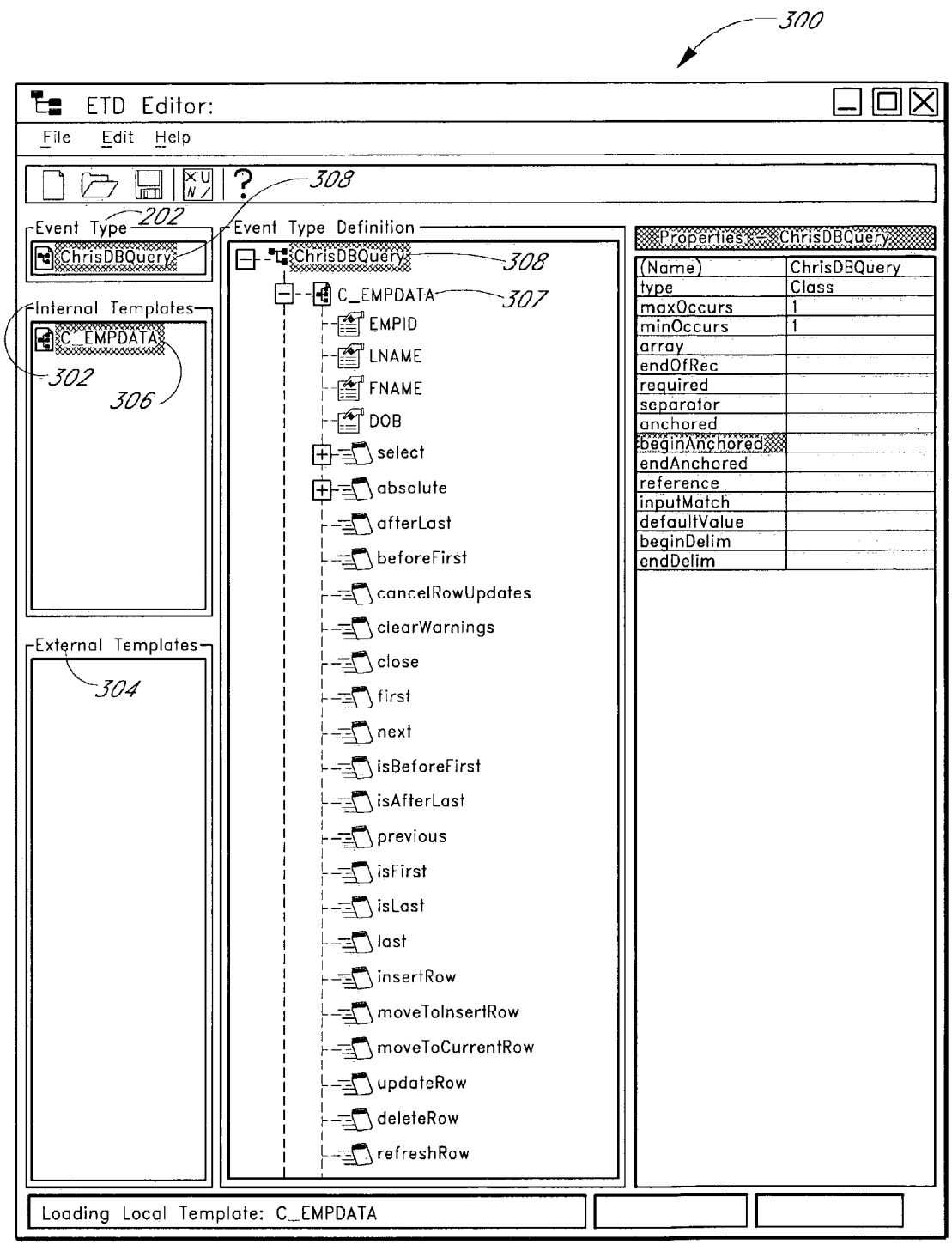
FIG. 3 illustrates a sample display of a drag and drop interface of an extended structure editor according to one embodiment of the invention for a relational database table.

FIG. 3 illustrates a sample display of a drag and drop interface of an event type definition editor 300 according to one embodiment of the invention with data loaded for a relational database table. FIG. 3 illustrates that an event type definition for retrieving data (querying) from a database table can be started from a template, such as a template provided by a vendor of the drag and drop interface. For clarity in FIG. 3, the tree structure includes nodes in uppercase and in lowercase. The uppercase nodes in the illustrated tree structure correspond to data to be retrieved, and the lowercase nodes in the illustrated tree structure list other nodes that can be used to perform operations against the database. The event type definition editor 300 advantageously permits extended structures for a relational database to be created and manipulated via an intuitive drag and drop interface.

In one embodiment, each event type definition can be associated with an event type definition template, which can be selected by the user or the integration engineer before creating a new structure. Of course, a new structure template can also be generated and used as desired. A structure template can be used to define the general characteristics of a structure, including the types of API functions with their parameters that are to be made available. Examples of general characteristics include the names of the fields in the structure, the properties of these fields, and the like. Examples of templates that can be predefined are templates for relatively popular software, such as templates for SAP BAPI, SAP IDoc, and the like. Structure templates can be selected from existing templates, which can be accessed via an internal templates pane 302 or an external templates pane 304. For example, the internal templates pane 302 can be used to access templates that are made by the user, and the external templates pane 304 can be used to store templates provided from another source, such as the provider of the event type definition editor 300. Once an appropriate structure is selected, one embodiment of the invention conveniently interacts with the user via a wizard, i.e., a series of data entry screens, to gather the appropriate information from the user, i.e., the integration engineer. It will be understood by one of ordinary skill in the art that other techniques, such as a data entry table, can also be used to enter data. For example, if a template for storing data to or retrieving from a relational database table is selected, the wizard can prompt for information such as: (i) database connection parameters such as a database name, a username and a password; and (ii) procedures and/or a predefined SQL statement for a database table.

From this sample information and the template, a full event type definition structure, which includes methods that access the database table, can advantageously be created such that no other customization of a database template is required. FIG. 3 illustrates an example of a structure 308 resulting from a database template 306 created for a table called "C_EMPDATA" 307 referenced within a structure called "ChrisDBQuery" 308.

Collaboration Rules Editor

Figures 4, 4A:
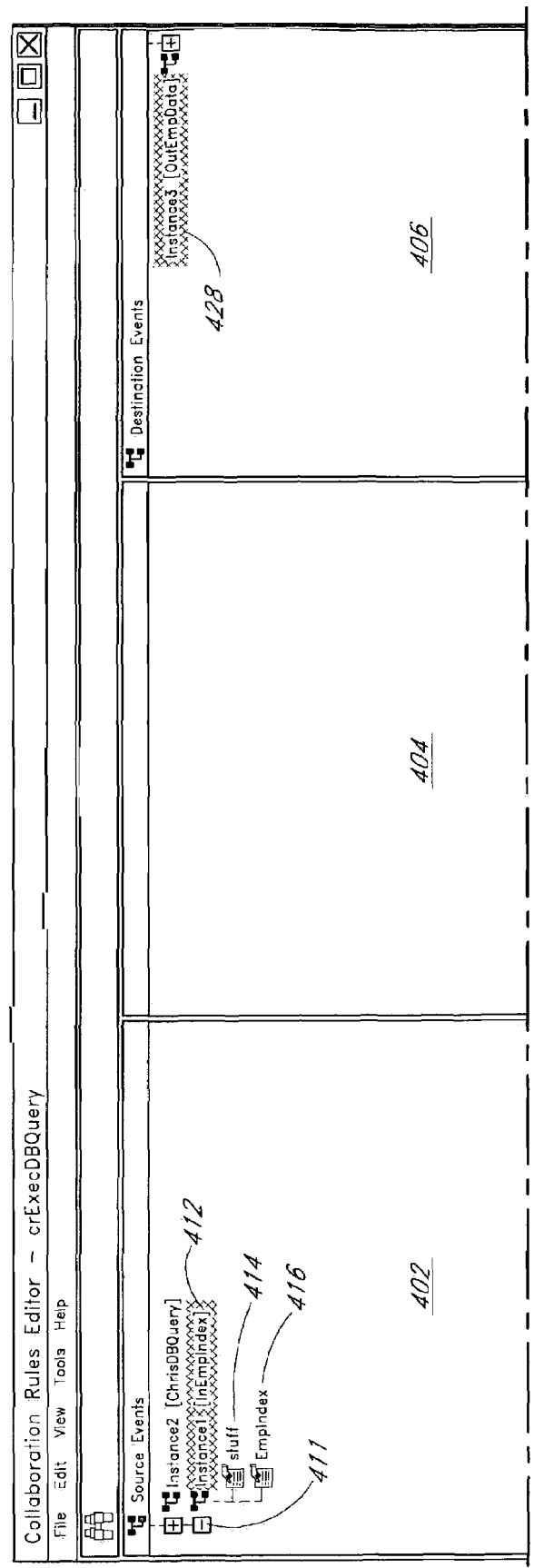
FIG. 4 consists of FIGS. 4A and 4B and illustrates an exemplary display of a graphical user interface for a collaboration rules editor for representing and/or manipulating software objects.
Figure 4B:
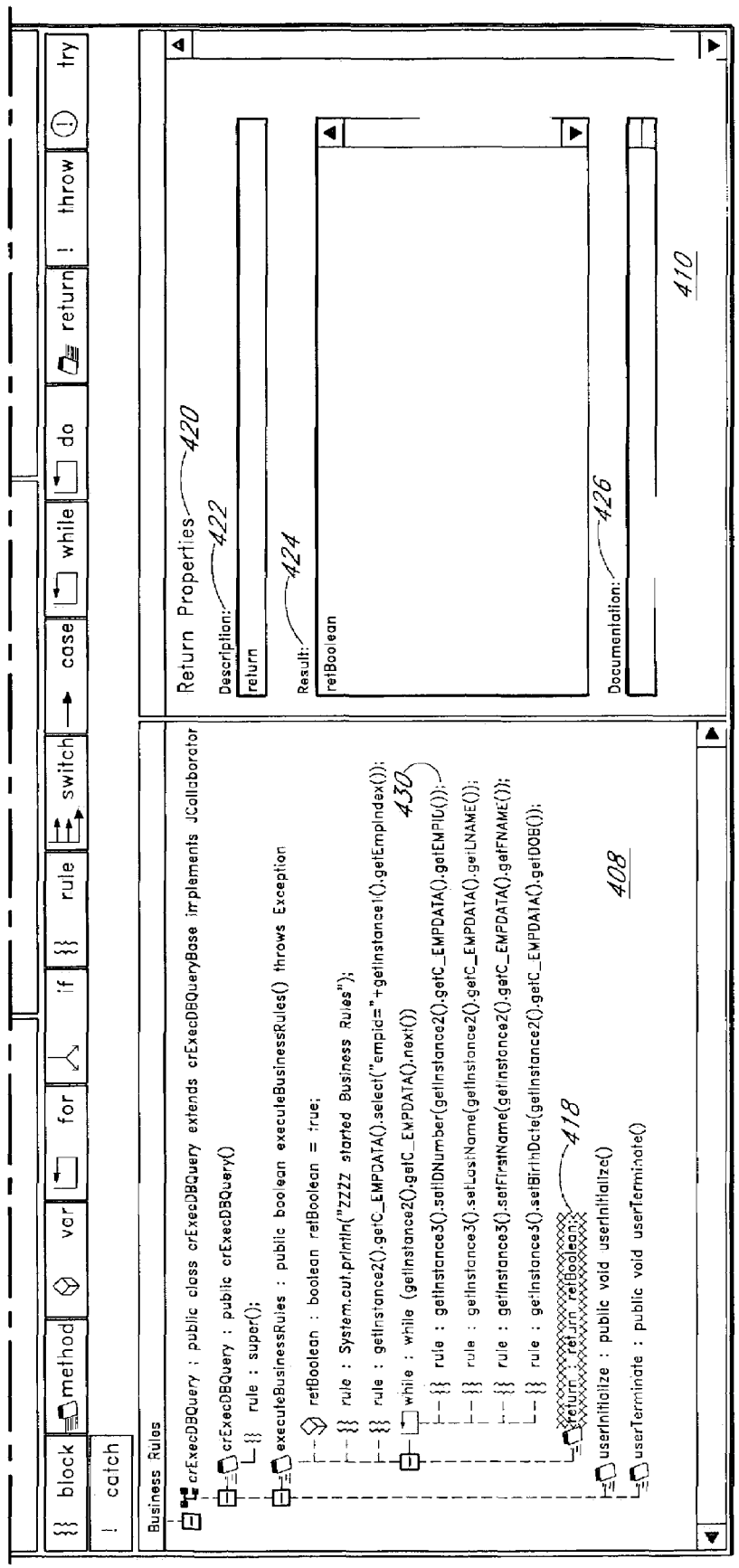

FIG. 4 illustrates an exemplary display for a graphical user interface 400 for a collaboration rules editor for representing and/or manipulating software objects.

A collaboration rules editor provides a drag and drop interface for creating and manipulating the rules for translating messages and calling API functions to send data to or receive data from the enterprise application.

A user, such as an integration engineer, can use the collaboration rules editor to create a set of rules that transforms data from one or more input event type definitions to one or more output event type definitions. Code related to data transformation can be included with code for mapping of data in a rules pane 408. The collaboration rules editor, as explained in further detail below, permits the integration engineer to efficiently generate software code with API function calls via the collaboration rules editor's drag and drop interface. One example of a user interface 400 for such a collaboration rules editor that can display rules for translating messages and can generate code for calling API functions is illustrated in FIG. 4. The sample display 400 of the collaboration rules editor includes a window with 3 upper panes 402, 404, 406 and with 2 lower panes 408, 410. It will be understood by one of ordinary skill in the art that the number and arrangement of panes within a window of a collaboration rules editor can vary in a very broad range.

A description of the panes of the user interface 400 of the collaboration rules editor is summarized in Table I.

TABLE I

| Pane Name | Pane Location |
|---|---|
| source event pane 402 | upper left |
| mapping pane 404 | upper middle |
| destination event pane 406 | upper right |
| rules pane 408 | lower left |
| rule properties pane 410 | lower right |

One embodiment of the drag and drop interface advantageously permits the user to generate code or to modify code related to the mapping of software objects, such as API calls. For example, one embodiment of the invention permits the following operations to be performed by the user via the illustrated drag and drop interface: Display/Collapse Node, Select Rule, Copy Node, Insert Node Reference, Insert API Call Reference, and Insert API Argument. It will be understood that other operations that can be performed by the drag and drop interface will be readily apparent to one of ordinary skill in the art.

Display/Collapse Node. The collaboration rules editor can be configured such that clicking a mouse button on a node symbol in a Source or Destination structure, i.e., using a pointing device such as a mouse device to move a pointer on the display screen to select the node via a node symbol, can result in expanding the node to display sub-nodes or collapsing the display of sub-nodes into a simple display of the node itself. For example, the pointer can select a node symbol 411 of an "Instance1 [InEmpIndex]" node 412, and the collaboration rules editor can respond by expanding the tree to display a sub-node for "stuff" 414 and a sub-node for "EmpIndex" 416 as illustrated in FIG. 4.

Select Rule. The collaboration rules editor can be configured such that selecting a rule in the rules pane 408 selects the rule and causes the properties associated with the rule to be displayed in the rule properties pane 410. The properties displayed in the rule properties pane 410 can vary depending on the type of rule selected in the rules pane 408. The type of rule selected also sets the insertion point for new rules added to the rules pane 408. For example, a rule for "return: return retBoolean;" is selected in the rules pane 408 of FIG. 4. In response, the collaboration rules editor displays properties for the "return return retBoolean;" rule in the rule properties pane 410. In the example illustrated in FIG. 4, the rule properties pane 410 reflects the selected rule by displaying a return properties 420 title, a description of the selected rule in a description field 422, a result of the selected rule in a result field 424, and documentation for the selected rule, if any, in a documentation field 426.

Copy Node. The collaboration rules editor can be configured such that a node symbol from an extended structure from the source event pane 402, which describes a source event, can be dragged on top of a node symbol in a destination event in the destination event pane 406. For example, the representation of EmpIndex sub-node 416 can be dragged and dropped to an Instance3 [OutEmpData] node 428 of the destination event pane 406. In one embodiment, the result of such dragging and dropping is the insertion of code which effects the copy of the selected source node to the selected destination node into the rules pane at the insertion point as will be described in greater detail later in connection with FIG. 5A.

Insert Node Reference. The collaboration rules editor can be configured such that a node symbol from a source event pane 402 can be dragged from the source event pane 402 and dropped into the description field 422, the result field 424, or the documentation field 426 of the rule properties pane 410. In response to such dragging and dropping, one embodiment of the collaboration rules editor inserts code that references the dragged node into the field in which it is dropped.

Insert API Call Reference. The collaboration rules editor can be configured such that a function call related to an API call that is described in a source event pane 402 can be dragged and dropped into the rules pane 408 or into the rule properties pane 410. In one embodiment, the collaboration rules editor automatically generates code relating to the API call at the position in the event type definition corresponding to the portion of the hierarchical tree in which the function call is dropped in the rules pane 408.

Insert API Argument. The collaboration rules editor can be configured such that a field node or an element node, such as the "Instance1 [InEmpIndex]" element node 412 or the stuff sub-node 414, respectively, of an event type definition which describes a structured message can be dragged from the source event pane 402 and dropped into the rule properties pane 410, and the collaboration rules editor inserts the contents of the field node or the element node as arguments into the rule corresponding to the rule properties pane 410. One embodiment of the user interface 400 also includes buttons, such as a button for "block," for "method," for "var," and the like to assist the user to insert relatively common Java programming constructs into the colaboration.

In addition to defining classes, sub-classes, and instance variables, other methods, i.e., events or functions of software objects, associated with each field and element can also be defined within the rules pane 408, such as: get<field or element>; set<field or element>; has<field or element>; and omit<field or element>. In the Java programming language, a method of an object is indicated to the right of a "." in the code as shown within the rules pane 408. For example, if the field or element is named "EmpID," then these four methods can be defined: (1) getEmpID; (2) setEmpID; (3) hasEmpID; and (4) omitEmpID.

A "get" method can be represented by a node in the collaboration rules editor, and the get method returns the value of the corresponding field or element. For example, a rule 430 including several get methods is illustrated in FIG. 4. The get method ".getEMPID( )" of the rule 430 retrieves the value for the field "EMPID" from the C_EMPDATA object.

A "set" method (not shown in FIG. 4), which can also be represented by a node, assigns a given value to the corresponding field or element. A "has" method (not shown in FIG. 4), which can also be represented by a node, returns a Boolean true or false state depending on whether the corresponding field or element does or does not have a value assigned to it. An "omit" method (not shown in FIG. 4), which can also be represented by a node, clears the corresponding field or element.

For field nodes, which correspond to leaf nodes within the object hierarchy and have no sub-nodes, one embodiment of the collaboration rules editor permits the illustrated four functions to operate only on a value contained within the leaf node corresponding to the field node. For element nodes, which can have sub-nodes, one embodiment of the collaboration can be configured to permit these four functions to operate recursively by calling corresponding functions for the sub-fields, sub-elements, sub-sub-fields, sub-sub-elements, etc., until the function has been resolved to its leaf nodes as described in greater detail earlier in connection with FIG. 2A.

Generating One or More Collaboration Rules

Figure 5A:
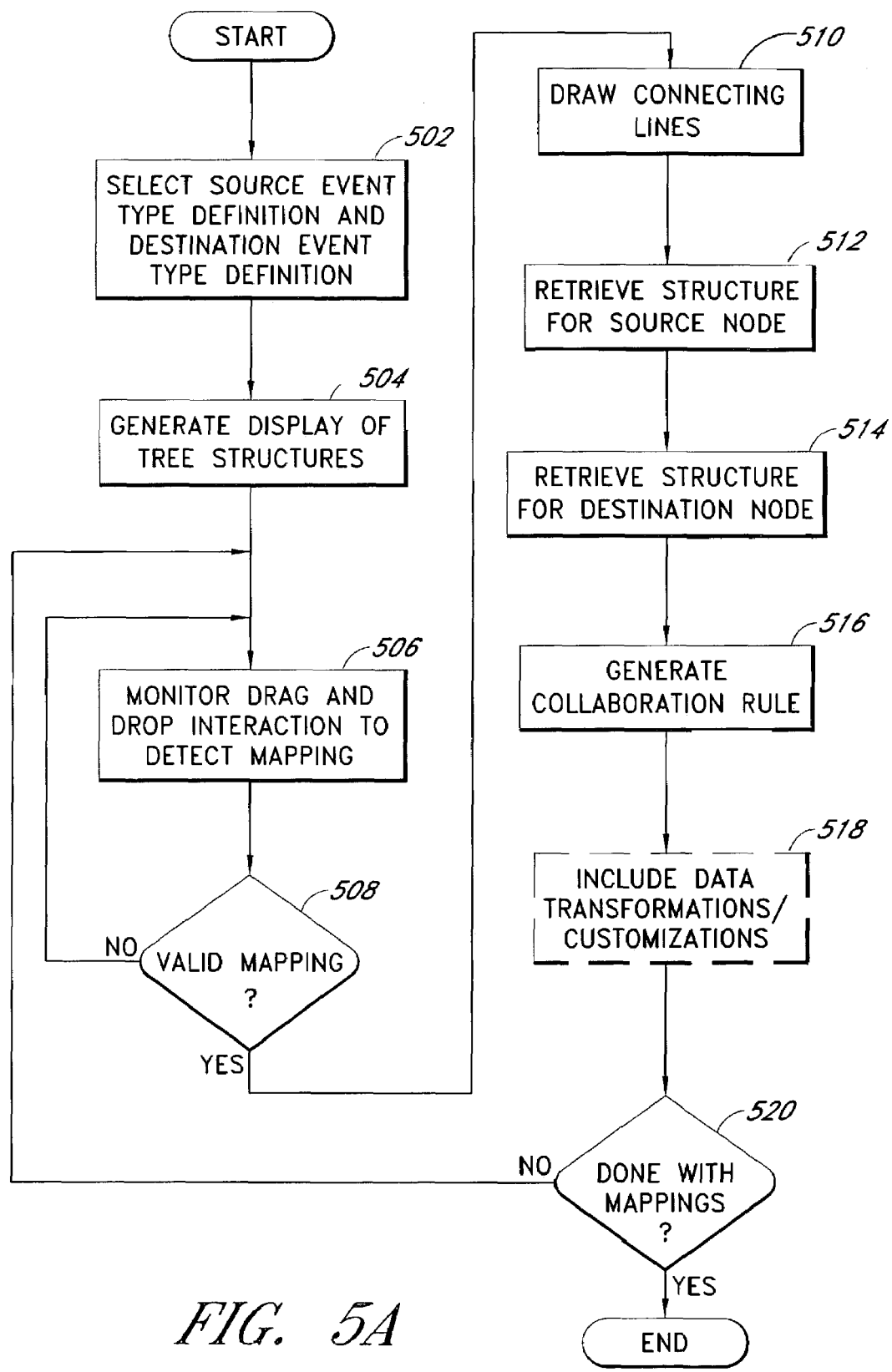
FIG. 5A is a flowchart that generally illustrates generating one or more collaboration rules.

FIG. 5A is a flowchart that generally illustrates generating one or more collaboration rules in a user interface, such as the user interface described earlier in connection with FIG. 4. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like. The process illustrated in FIG. 5A can advantageously be used to generate API calls that permit disparate APIs of otherwise incompatible software applications to communicate.

The process begins in a state 502, where a source event type definition and a destination event type definition are selected. For example, these event type definitions can be selected from provided templates, can be created by the user using an ETD editor, etc. The process advances from the state 502 to a state 504.

In the state 504, the process generates a display of the tree structures corresponding to the selected event type definitions. For example, with reference to FIG. 4, the process can interact with a user through a user interface to select a source event, which is then represented in the pane 402 to the left, and to select a destination event, which is then represented in the pane 406 to the right. The process advances from the state 504 to a state 506.

In the state 506, the process monitors drag and drop interaction with the user. It will be understood that such monitoring can be performed on an ongoing basis and can be performed in response to interrupts provided by the operating system in response to user actions such as mouse clicks. The process advances from the state 506 to a decision block 508.

In the decision block 508, the process determines whether or not the mapping specified through the user interface is valid. For example, a user may inadvertently specify a mapping from a text field to a numeric field, from a representation of a node of a source event to someplace other than a node of a destination event, and the like. In response to an invalid mapping, the process returns from the decision block 508 to the state 506 to continue to monitor user interaction. Of course, the process can also display warning messages and the like in response to a selection by the user of an invalid mapping. The process proceeds from the decision block 508 to a state 510 when the mapping requested is valid.

In the state 510, the process draws lines in the display to illustrate the specified mapping. An example of such a line is a line 606, which will be described later in connection with FIG. 6. In one embodiment, the line can include one or more line segments such that portions of the line in the source event pane and in the destination event pane can be drawn in a horizontal manner. The use of the line advantageously permits a user, such as an integration engineer, to quickly and efficiently verify the desired mapping. The process advances from the state 510 to a state 512.

In the state 512, the process retrieves the structure for the selected source node such that the process can generate code that retrieves data from the selected source node. The process advances from the state 512 to a state 514.

In the state 514, the process retrieves the structure for the selected destination node such that the process can generate code that inserts data into the selected source node. It will be understood that the order of retrieving the structures for the source node and the destination node can be interchanged and that the illustrated order is used only as an example. The process advances from the state 514 to a state 516.

In the state 516, the process generates the collaboration rule from the structures for the nodes retrieved in the state 512 and in the state 514. In one embodiment, the collaboration rules are generated and displayed in a pane 408 of the user interface. One example of an automatically generated collaboration rule written in Java is described as a line of code 614 later in connection with FIG. 6. A portion of the code 618 corresponds to the structure from the selected source node and permits the data to he retrieved. The remaining portions of the line of code 614 correspond the selected destination node and permit the data to be placed in the destination node. While illustrated in the context of Java, it will be understood that other programming languages can also be used. The process advances from the state 516 to an optional state 518.

In the optional state 518, the process permits customizations to be made to the code by permitting editing of the code in the pane 408. Examples of code for data transformations/customizations include code that converts text from a mix of upper and lower case to all uppercase. It will be understood that this customization activity can occur at other times during the process and can also be applied to lines of code other than the line of code generated by the mapping, such as a line of code generated by a prior mapping. The process advances from the optional state 518 to a decision block 520.

In the decision block 520, the process determines whether more mappings are to be made or whether the mapping is complete. The process can retrieve an indication from the user interface, such as a "save" command to indicate that the mapping is complete. The mapping returns from the decision block 520 to the state 506 when there are further mappings to be made. When mapping is complete, the process can end and perform tasks such as save the collaboration rule in a file. It will be understood that the process can be invoked again later or that another process to modify an existing mapping can be invoked as described later in connection with FIG. 5B.

Modifying One or More Collaboration Rules

Figure 5B:
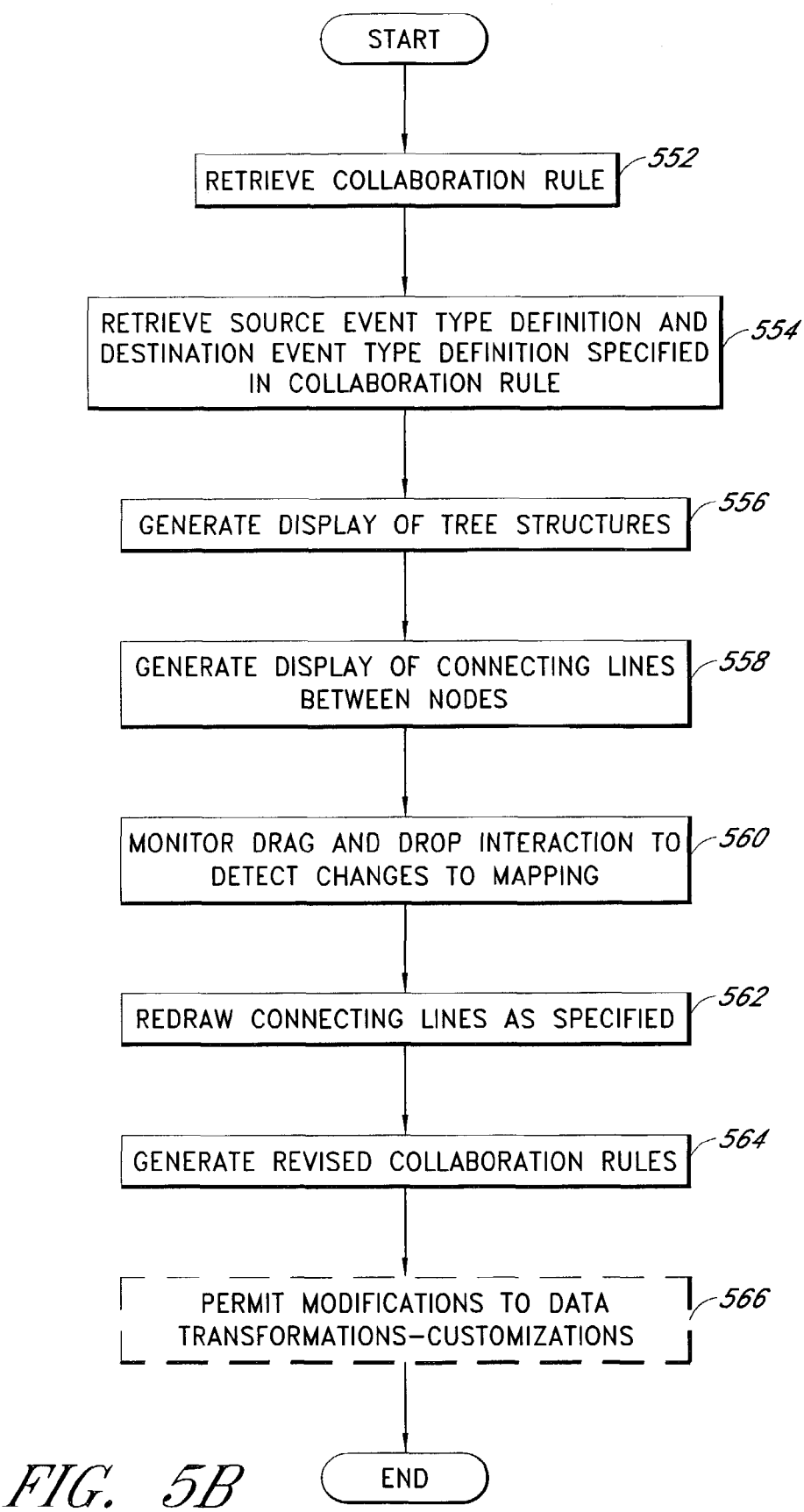
FIG. 5B is a flowchart that generally illustrates modifying one or more collaboration rules.

FIG. 5B is a flowchart that generally illustrates modifying one or more collaboration rules. In one example, a collaboration rule to be modified can correspond to a collaboration rule that has been created by the process described earlier in connection with FIG. 5A. However, it will be understood that a collaboration rule can be retrieved from other sources, such as from manually written source code. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like.

The process starts at a state 552. In the state 552, the process retrieves a collaboration rule for modification. For example, the collaboration rule can be retrieved in response to a user selection of a file containing the collaboration rule. The process advances from the state 552 to a state 554.

In the state 554, the process retrieves the source event type definition and the destination event type definition used in the collaboration rule. The source event type definition and the destination event type definition can be stored in separate files or in the same file as the collaboration rule. The process advances from the state 554 to a state 556.

In the state 556, the process generates the display of the tree structures corresponding to the source event type definition and the destination event type definition. In the illustrated examples, the tree structures for the source event type definition and for the destination event type definition are displayed in the upper left pane 402 and the upper right pane 406, respectively. The process advances from the state 556 to a state 558.

In the state 558, the process draws lines between the nodes of the source event type definition and the destination event type definition to represent the mappings that were specified in the selected collaboration rule. This advantageously permits an integration engineer to quickly and efficiently analyze the existing mappings of the collaboration rule loaded in the user interface. The process advances from the state 558 to a state 560.

In the state 560, the process monitors the drag and drop interaction to detect changes to mapping between nodes. It will be understood that monitoring of the drag and drop interaction can occur on an ongoing basis. The drag and drop interaction can specify, for example, the deletion of existing mappings, the addition of new mappings, and the like, via user interaction such as the dragging and dropping of nodes and/or the manipulation of the lines connecting the nodes. The process advances from the state 560 to a state 562.

In the state 562, the process redraws lines in the user interface as specified by changes to the mapping. The process advances from the state 562 to a state 564.

In the state 564, the process generates new or revised collaboration rules in response to the changes to the mapping. For example, when a line is deleted, the process can delete the corresponding collaboration rule. In another example, when a line is added, the process can add a corresponding collaboration rule. The process advances from the state 564 to an optional state 566.

In the optional state 566, the process permits transformations/customizations to be made to mappings such as by entry of code in the pane 408. It will be understood that the these customizations can be applied at other points in the process. In addition, it will be understood that a customization can be applied without a change in the mapping. The process can then end by, for example, saving the changes to the collaboration rules in a file. It will be understood that various portions of the process illustrated in FIG. 5B can be repeated as desired.

EXAMPLE 2

Event Translation

Figure 6B:
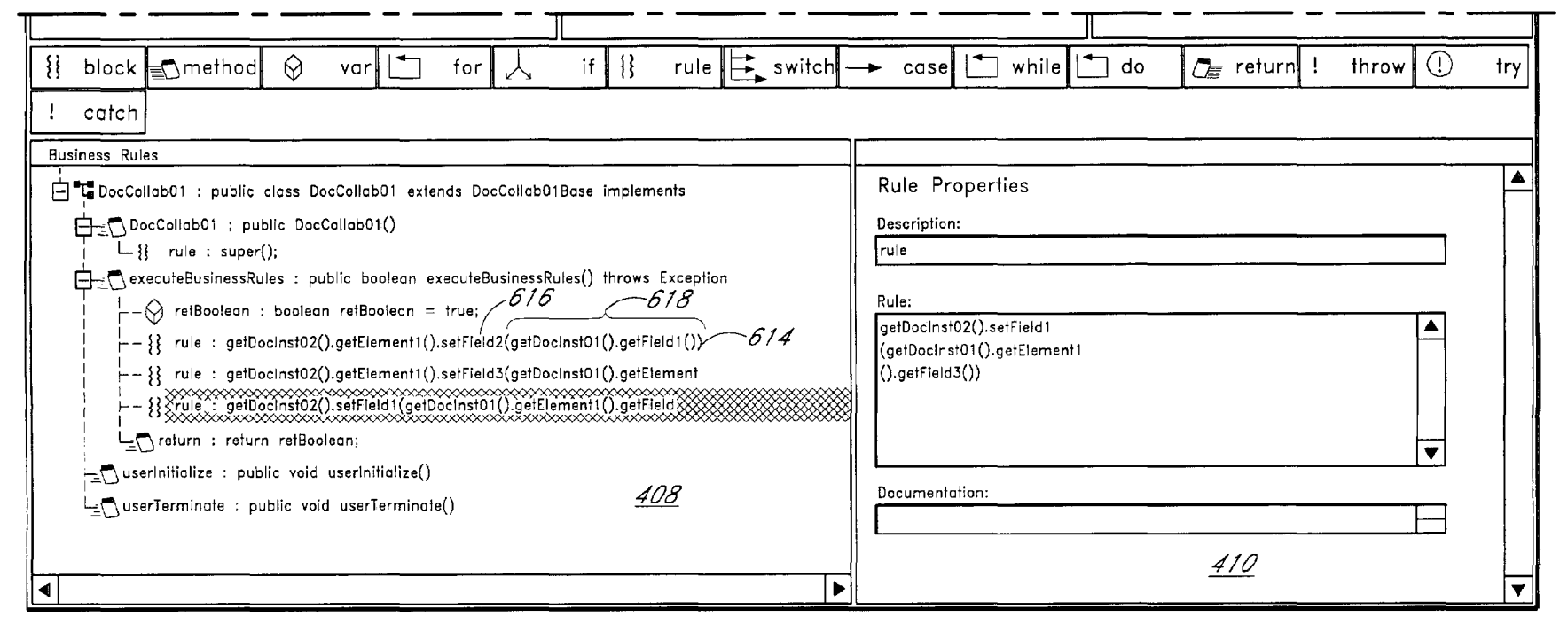

FIG. 6 illustrates an example of using a collaboration rules editor 600 to generate code that translates an input event into an output event. The translation can be used to reformat API calls from a first format that is intended to be read by one computer system to a different format that can be read by another computer system. The structure that was generated by the event type definition editor 250 described earlier in connection with FIG. 2A is used to organize the input event so that the input event can be translated to an output event. In the illustrated example, a user, such as an Integration Engineer, used the collaboration rules editor 600 as follows: (1) created one or more collaboration rules, i.e., event translations, specifying that the input and output events both match the structure described in Example 1; and (2) dragged Field1, Field2 and Field3 from the source event pane 402 to Field2, Field3 and Field1, respectively, in the destination event pane 406.

The graphical user interface (GUI) of the illustrated collaboration rules editor 600 is divided into upper panes 402, 404, 406, illustrating source and destination fields connected by lines and two lower panes 408, 410 illustrating a list of rules and rule properties. It will be understood by one of ordinary skill in the art that the graphical user interface can be provided in a very broad array of configurations.

The source event pane 402 includes a diagram of the input structure corresponding to Event01 602, which was also described earlier in connection with Event01 254 in FIG. 2A. In FIG. 6, the event diagram loaded in the source event pane 402 is shown in an expanded state so that Field1 603 is displayed as a leaf node immediately under Event01 602. Likewise, Element01 608 is an element immediately under Event01 602 and branches to two leaf nodes: Field2 610 and Field3 612. The additional part of the structure shows additional information that is used to support the Extended Structure Definition. In one embodiment, the collaboration rules editor advantageously uses the structure for the source event as the starting point for the structure of the destination event, which is then modified to produce the desired destination event structure. This can simplify the creation of the destination event structure.

An indicator such as a line 606 in the upper panes 402, 404, 406 graphically illustrates the mapping from a source event to a destination event. Other lines in the upper panes 402, 404, 406 are used to graphically connect other input fields from the source event pane 402 to other output fields in the destination event pane 406. The lines in the mapping pane 404 illustrate how nodes, in this case, fields, can be mapped from one location in the hierarchy for the source event to a different location in the hierarchy for the destination event. For example, the lines illustrate that input Field1 603 is copied to output Field2 622, input Field2 610 is copied to output Field3 623, and input Field3 612 is copied to output Field1 624.

The rules pane 408 illustrates a list of rules, which can include automatically generated rules and manually customized code. As described later in connection with FIGS. 5A and 5B, collaboration rules can be automatically generated in response to drag and drop interaction with the user interface. In the example shown in FIG. 6, the rules are implemented as Java code that uses the definitions created in the extended structure editor described earlier in connection with FIG. 2A to define translations. An example of a rule is:
"getDocInst02( ).getElement1( ).setField2(getDocInst01( ).getField1( ))" 614

Analyzing in the sequence from inside to out, the first processing to take place is to calculate the value of the argument to the setField2( ) function 616, which is the result of the following:

"getDocInst01( ).getField1( )" 618

This expression retrieves the current instance of an input message called "DocInst01" instance 620 and from the current instance retrieves the value of Field1 603. The resulting value is used to set the value of Field2 622 within the Element1 element 624 of the "DocInst02" instance 626 of the output message.

In the illustrated embodiment of the graphical user interface of the collaboration rules editor, the events can receive distinct instance names, "DocInst01" instance 620 and "DocInst02" instance 626, which are used instead of the event type "DocEvent01" that the instance names map. In another embodiment, the instance names can be the same. This permits a user, such as an Integration Engineer, to advantageously and efficiently distinguish between input events and output events, which can, as in this example, be associated with the same event type, such as event type "Event01."

In this example, the collaboration rules illustrated in the rules pane 408 are saved to a structure, which is then compiled and implemented in Java code under the file name DocCollab01.java 628. It will be understood by one of ordinary skill in the art that other suitable object-oriented languages and their corresponding file extensions can also be used.

EXAMPLE 3

API Mapping

Figure 7A:
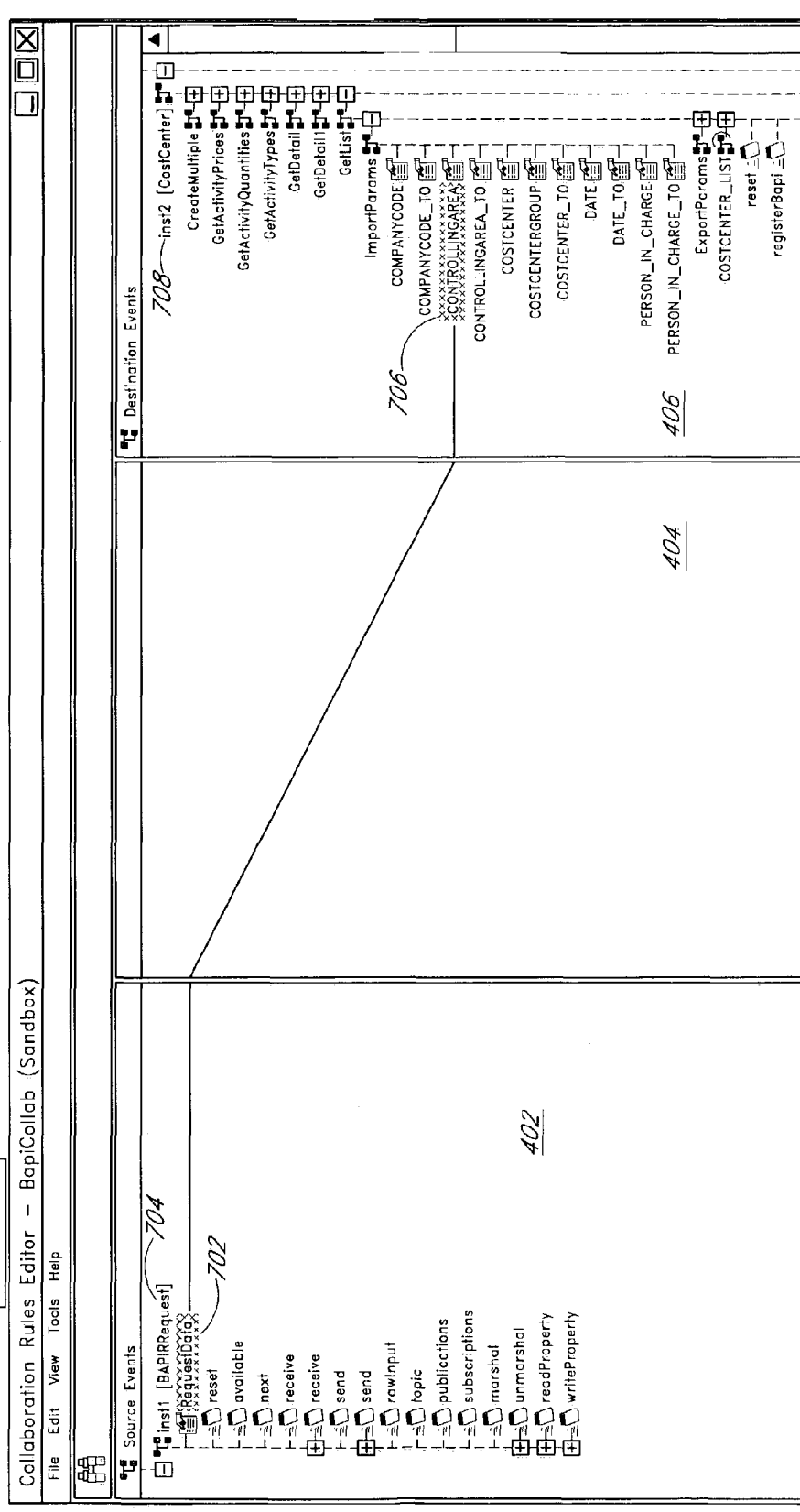
FIG. 7 consists of FIGS. 7A and 7B and illustrates a sample display of a graphical user interface for a collaboration rules editor that can be used to map one API call to another API call.
Figure 7B:
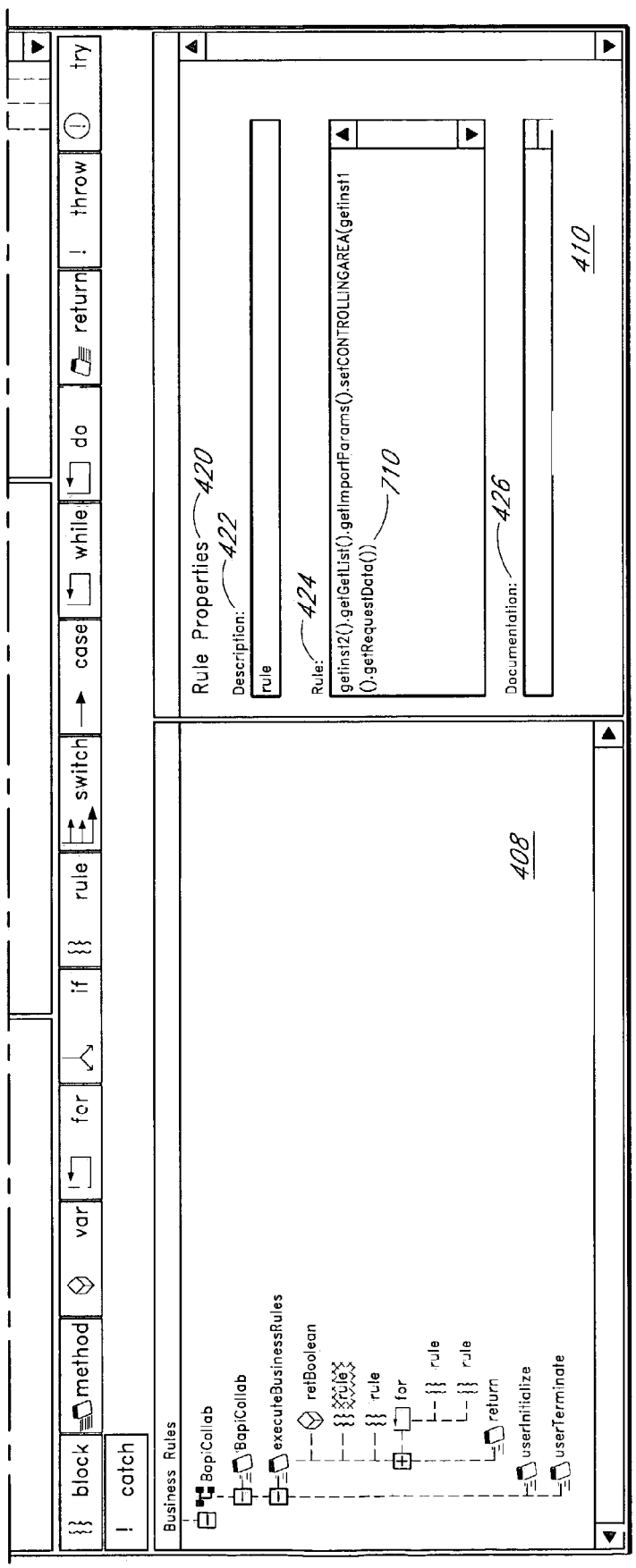

FIG. 7 illustrates an example of using a collaboration rules editor 700 to map one API call to another API call. Advantageously, the collaboration rules editor 700 graphically illustrates the mapping of one API call to another API call such that a user, such as an integration engineer, can easily verify the correctness of the desired API call mapping. For example, a source event can be mapped to an actual API of an enterprise application that is being integrated. For example, the actual API can be provided by the vendor of the enterprise application. This mapping can permit two disparate enterprise applications that were not originally intended to communicate to advantageously exchange data. In the illustrated example, a user, such as an integration engineer, used the collaboration rules editor 700 as follows: (1) created a new collaboration rule (event translation) specifying the input event structure; (2) used an automated facility, such as another screen containing a wizard that is configured to query an application to be integrated, such as SAP BAPI), to query the application for its API structure, which is illustrated in the pane 406 of FIG. 7; and (3) dragged the RequestData method 702 in the source event 704 to the CONTROLLINGAREA method 706 in the destination event 708, creating a line joining the source event and the destination event in the panes 402, 404, 406. The line persists and can be made permanent to illustrate the mapping, but it will be understood by one of ordinary skill in the art that the line can also be temporarily drawn, stretched, and moved while the cursor is being manipulated.

An exemplary screen shot of the resulting structure 710 for Java code is shown in the result field 424 of the rule properties pane 410 of the collaboration rules editor 700 illustrated in FIG. 7.

EXAMPLE 4

Database Stored Procedure Mapping

Figures 8, 8A:
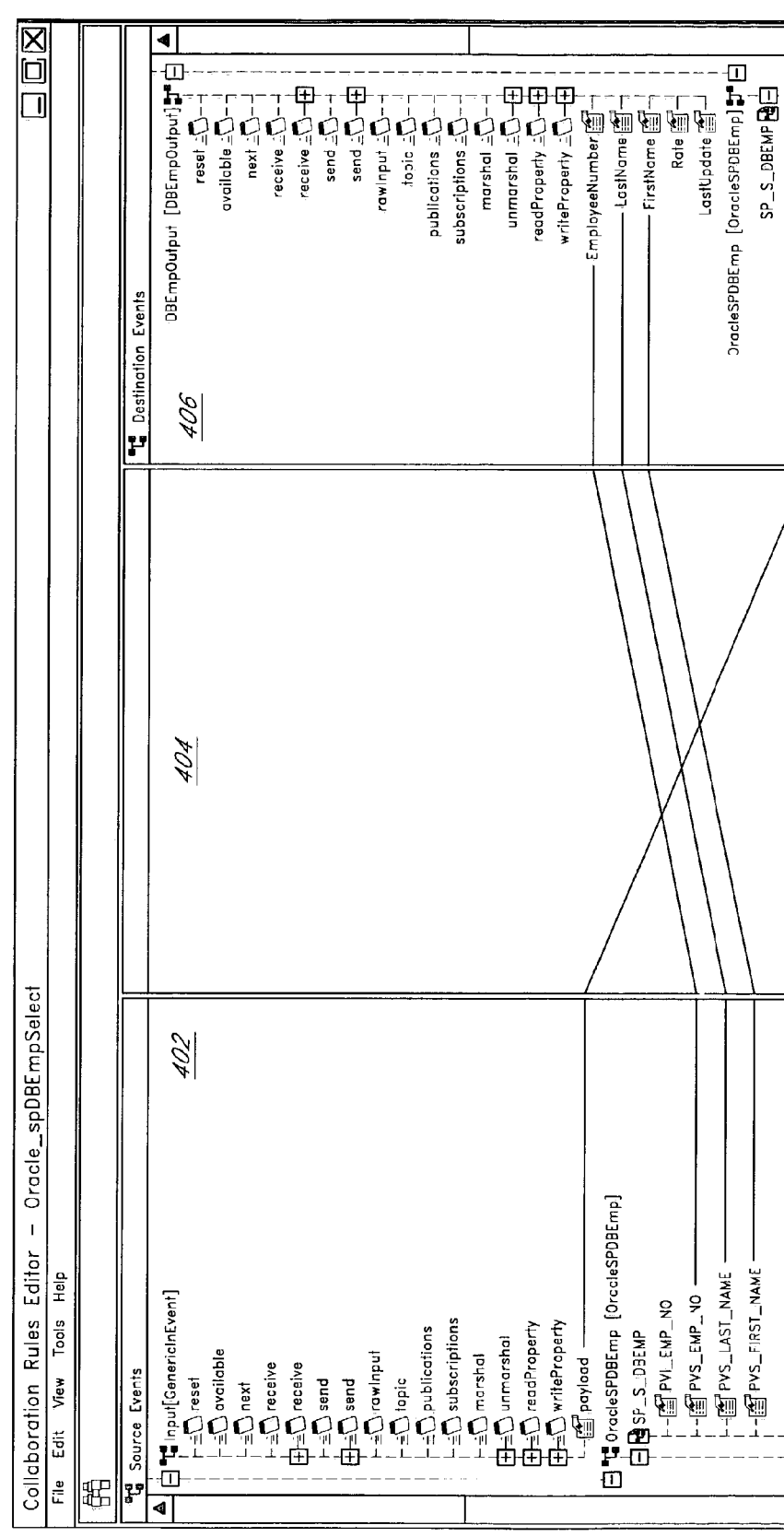
FIG. 8 consists of FIGS. 8A and 8B and illustrates a sample display of a graphical user interface for a collaboration rules editor that can be used to generate code that calls a stored procedure in a database.
Figure 8B:
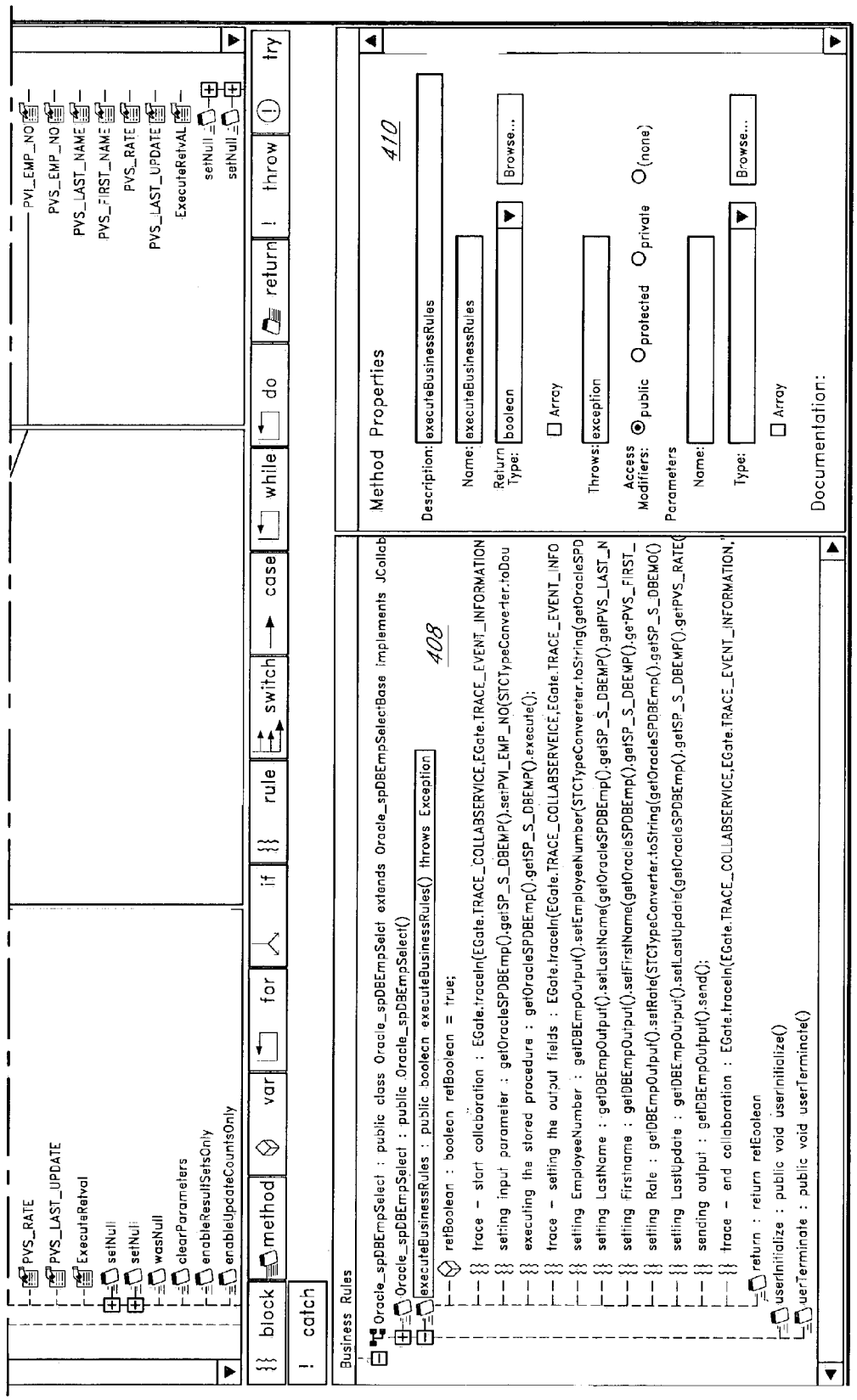

FIG. 8 illustrates an example of using a collaboration rules editor 800 to represent and to generate code that calls a stored procedure in a relational SQL database. A stored procedure is a pre-programmed interface method that is stored in a SQL database. When an application, such as an enterprise application, calls the stored procedure, the stored procedure performs specific transactions with the SQL database when executed. For example, an application can execute a stored procedure by sending a relatively small remote procedure call (RPC) from a client computer on which the application resides to the SQL database server.

This advantageously reduces the amount of data transferred over a corresponding network, i.e., network traffic, versus accessing the remote database directly from the client computer. Beneficially, this increases the speed and efficiency of applications as the code for performing the desired operations on the database is already present in the database and merely called by the RPC.

Advantageously, a tree structure with subsidiary nodes can be used to represent a stored procedure as illustrated in pane 406 of FIG. 8. A pane 402 to the left represents the API, and the pane 406 to the right represents the stored procedure. Interconnecting lines represent mapping between the API and the stored procedure. Stored procedures can use specified parameters, and can return corresponding values when properly executed. Embodiments of the invention can be used to represent calling a stored procedure by passing it parameters, then passing the returned data to a second API of the SQL database that permits access to call the stored procedure.

Alternate Implementations

Screen Representation

It will be understood by one of ordinary skill in the art that numerous variations of a screen representation by which an Integration Engineer can link nodes into a hierarchy and set the properties of each node are possible. For example, a source event can be represented in a pane to the right of the screen and a destination event can be represented in a pane to the left of the pane.

Programming Language Considerations

It will be understood by the skilled practitioner that a variety of object-oriented programming languages can be used in connection with embodiments of the invention. Examples of object-oriented languages include C++, Java, Smalltalk, Eiffel, C#, Python, and the like. In one embodiment, the Java programming language is selected as the underlying programming language due to: object orientation; and commonality or portability of Java across platforms.

However, it will be understood by the skilled practitioner that embodiments of the invention can be programmed using another object-oriented language, such as C++. Preferably, the selected object-oriented language permits a correlation between the object hierarchy (of fields, elements, methods and parameters) and a class hierarchy.

Various embodiments of the invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A computer-implemented method for generating a message structure for a message for making an application program interface (API) call in a graphical user interface, the method comprising:

displaying a representation for a root node in response to a request to display a new message structure, where the representation appears in a pane of the graphical user interface;

receiving a request to add a child node to the root node, where the child node is selected from the group consisting of element nodes, field nodes, method nodes, and parameter nodes;

displaying a representation of the added child node to the root node such that a hierarchical relationship between the added child node and the root node is illustrated in a hierarchical tree;

automatically generating code for the message structure, wherein the message structure is represented by the hierarchical tree, wherein the code includes embedded delimiters that indicate a hierarchical structure of the message structure, and wherein the message structure corresponds to a message for making an API call;

detecting that a pointer that is manipulated by a pointing device is guided over a portion of a displayed node in the hierarchical tree;

receiving an indication that a button on the pointing device has been selected and continues to be selected when the pointer is over the portion of the displayed node;

detecting movement of the pointer by the pointing device;

visually dragging the displayed node in correspondence with the movement of the pointer;

receiving an indication that the button on the pointing device has been released;

detecting that the pointer has moved from an original point in the hierarchical tree to a second point in the hierarchical tree, where the second point corresponds to a location of the pointer when the button has been released;

dropping the displayed node at the second point to display a revised hierarchical tree; and automatically regenerating code for the message structure, wherein the message structure is represented by the revised hierarchical tree, and wherein the code includes embedded delimiters that indicate the hierarchical structure of the message structure represented by the revised hierarchical tree.

2. The method as defined in claim 1, further comprising:

receiving a request to add a sub-node to the child node; and displaying a representation of the added sub-node such that the hierarchical relationship between the added sub-node and the child node is illustrated in the hierarchical tree.

3. The method as defined in claim 1, further comprising:

detecting that a pointer is over a portion of a displayed node in the hierarchical tree and that an input from a pointing device has been received such that the displayed node is selected; and displaying a list of properties for the selected node in a separate pane of the graphical user interface in response to the selection of the node.

4. The method as defined in claim 1, wherein the child node that is added is selected from a pre-programmed API function.

5. The method as defined in claim 1, wherein the child node that is added is selected from a pre-programmed interface method.

6. A computer-readable medium having computer-executable instructions stored thereon which, when executed by one or more processors, cause the one or more processors to perform a method for generating a message structure for a message for making an application program interface (API) call, the method comprising:

displaying a representation for a root node in response to a request for a new message structure, where the representation appears in a pane of a graphical user interface;

receiving a request to add a child node to the root node, where the child node is selected from the group consisting of element nodes, field nodes, method nodes, and parameter nodes;

displaying a representation of the added child node to the root node such that a hierarchical relationship between the added child node and the root node is illustrated in a hierarchical tree;

automatically generating code for the message structure, wherein the message structure is represented by the hierarchical tree, wherein the code includes embedded delimiters that indicate a hierarchical structure of the message structure, and wherein the message structure corresponds to a message for making an API call;

detecting that a pointer that is manipulated by a pointing device is guided over a portion of a displayed node in the hierarchical tree;

receiving an indication that a button on the pointing device has been selected and continues to be selected when the pointer is over the portion of the displayed node;

detecting movement of the pointer by the pointing device;

visually dragging the displayed node in correspondence with the movement of the pointer;

receiving an indication that the button on the pointing device has been released;

detecting that the pointer has moved from an original point in the hierarchical tree to a second point in the hierarchical tree, where the second point corresponds to a location of the pointer when the button has been released;

dropping the displayed node at the second point to display a revised hierarchical tree; and automatically regenerating code for the message structure, wherein the message structure is represented by the revised hierarchical tree, and wherein the code includes embedded delimiters that indicate the hierarchical structure of the message structure represented by the revised hierarchical tree.

7. The computer readable medium as defined in claim 6, wherein the method further comprises:

receiving a request to add a sub-node to the child node; and displaying a representation of the added sub-node such that the hierarchical relationship between the added sub-node and the child node is illustrated in the hierarchical tree.

8. The computer readable medium as defined in claim 6, wherein the method further comprises:

detecting that a pointer is over a portion of a displayed node in the hierarchical tree and that an input from a pointing device has been received such that the displayed node is selected; and displaying a list of properties for the selected node in a separate pane of the graphical user interface in response to the selection of the node.

9. The computer readable medium as defined in claim 6, wherein the child node that is added is selected from a pre-programmed API function.

10. The computer readable medium as defined in claim 6, wherein the child node that is added is selected from a pre-programmed interface method.

11. A system for generating a message structure for a message for making an application program interface (API) call, the system comprising:

one or more processors and a memory, the memory comprising instructions executed by the one or more processors to implement:

a graphical user interface;

a module configured to display a representation for a root node in response to a request for a new message structure, where the representation appears in a pane of the graphical user interface;

a module configured to receive a request to add a child node to the root node, where the child node is selected from the group consisting of element nodes, field nodes, method nodes, and parameter nodes;

a module configured to display a representation of the added child node to the root node such that a hierarchical relationship between the added child node and the root node is illustrated in a hierarchical tree;

a module configured to automatically generate code for the message structure, wherein the message structure is represented by the hierarchical tree, wherein the code includes embedded delimiters that indicate a hierarchical structure of the message structure, and wherein the message structure corresponds to a message for making an API call;

a module configured to detect when a pointer that is manipulated by a pointing device is guided over a portion of a displayed node in the hierarchical tree;

a module configured to detect that a button on the pointing device has been selected and continues to be selected when the pointer is over the potion of the displayed node;

a module configured to detect a position of the pointer;

a module configured to visually drag the displayed node in the graphical user interface in correspondence with motion of the pointer;

a module configured to receive an indication that the button on the pointing device has been released;

a module configured to detect that the pointer has moved from an original point in the hierarchical tree to a second point in the hierarchical tree, where the second point corresponds to a location of the pointer when the button has been released;

a module configured to drop the displayed node at the second point to display a revised hierarchical tree; and a module configured to automatically regenerate code for the message structure, wherein the message structure is represented by the revised hierarchical tree, and wherein the code includes embedded delimiters that indicate the hierarchical structure of the message structure represented by the revised hierarchical tree.

12. The system as defined in claim 11, further comprising:

a module configured to receive a request to add a sub-node to the child node; and a module configured to display a representation of the added sub-node such that the hierarchical relationship between the added sub-node and the child node is illustrated in the hierarchical tree.

13. The system as defined in claim 11, further comprising:
a module configured to detect that a pointer is over a portion of a displayed node in the hierarchical tree and that an input from a pointing device has been received such that the displayed node is selected; and
a module configured to display a list of properties for the selected node in a separate pane of the graphical user interface in response to the selection of the node.

14. The system as defined in claim 11, wherein the child node that is added is selected from a pre-programmed API function.

15. The system as defined in claim 11, wherein the child node that is added is selected from a pre-programmed interface method.

* * * * *